(12) United States Patent
Mitsunaga et al.

(10) Patent No.: US 7,098,263 B2
(45) Date of Patent: Aug. 29, 2006

(54) THERMOPLASTIC RESIN COMPOSITION, MOLDED ARTICLE, AND PROCESS FOR PRODUCING THE SAME

(75) Inventors: Masaki Mitsunaga, Tokyo (JP); Katsuhiko Hironaka, Tokyo (JP); Masami Okamoto, Shiga (JP)

(73) Assignee: Teijin Chemicals, Ltd., Tokyo (JP)

( * ) Notice: Subject to any disclaimer, the term of this patent is extended or adjusted under 35 U.S.C. 154(b) by 411 days.

(21) Appl. No.: 10/381,103

(22) PCT Filed: Jul. 19, 2002

(86) PCT No.: PCT/JP02/07359

§ 371 (c)(1), (2), (4) Date: Aug. 13, 2003

(87) PCT Pub. No.: WO03/010235

PCT Pub. Date: Feb. 6, 2003

(65) Prior Publication Data

US 2004/0030021 A1    Feb. 12, 2004

(30) Foreign Application Priority Data

| Jul. 23, 2001 | (JP) | ............................ 2001-221168 |
| May 17, 2002 | (JP) | ............................ 2002-142589 |
| May 21, 2002 | (JP) | ............................ 2002-146387 |
| May 21, 2002 | (JP) | ............................ 2002-146388 |
| May 22, 2002 | (JP) | ............................ 2002-147429 |

(51) Int. Cl.
C08K 3/34 (2006.01)

(52) U.S. Cl. ..................... 524/445; 524/447; 524/449

(58) Field of Classification Search ................ 524/445, 524/447, 449
See application file for complete search history.

(56) References Cited

U.S. PATENT DOCUMENTS 4,810,734 A * 3/1989 Kawasumi et al. ......... 523/216
6,521,690 B1 * 2/2003 Ross et al. .................. 524/445

FOREIGN PATENT DOCUMENTS

| JP | 3-215558 | 9/1991 |
| JP | 7-207134 | 8/1995 |
| JP | 7-228762 | 8/1995 |
| JP | 7-331092 | 12/1995 |
| JP | 8-151449 | 6/1996 |
| JP | 9-143359 | 6/1997 |
| JP | 10-60160 | 3/1998 |
| JP | 2000-169689 | 6/2000 |
| JP | 2000-178392 | 6/2000 |
| JP | 3079103 | 6/2000 |
| JP | 2000-239397 | 9/2000 |
| JP | 2001-131400 | 5/2001 |
| JP | 2002-88255 | 3/2002 |
| WO | 99/32403 | 1/1999 |

OTHER PUBLICATIONS

"Polymer Handbook", 1999, John Wiley & Sons, Inc. Fourth Edition, pp. 684-686.
"Polymer Engineering and Science", Society of Plastics Engineers, Inc., Feb. 1974, vol. 14, No. 2, pp. 147-154 & 472.
Huang et al., Macromolecules, vol. 54, pp. 2000-2001 (2000).
Geralda Severe, et al., "Effect of Layered Silicates on Thermal Characteristics of Polycarbonate Nanocomposites", ANTEC 2000, pp. 1523-1526.
"Polymer Preprints", The Society of Polymer Science, Japan, vol. 51, No. 3, 2002, p. 669.
"Polymer Processing", The Japanese Society of Polymer Processing, 2002, pp. 15-16 & 454.
"Polymer Reprints", The Society of Polymer Science, Japan, vol. 51, No. 11, 2002, pp. 2645-2646.
"Polymer Handbook" 3rd Edition, 1989, John Wiley & Sons, Inc., p. 550.

* cited by examiner

*Primary Examiner*—Peter Szekely
(74) *Attorney, Agent, or Firm*—Wenderoth, Lind & Ponack, L.L.P.

(57) ABSTRACT

A thermoplastic resin composition comprising:
(A) 100 parts by weight of a noncrystalline thermoplastic resin component (component A);
(B) 0.1 to 50 parts by weight of a layered silicate (component B) which satisfies the following (i) to (iii):
(i) it has a cation exchange capacity of 50 to 200 milliequivalents/100 g, and at least 40% of the cation exchange capacity being exchanged with an organic onium ion,
(ii) 60% or more of the layered silicate particles have a thickness of 100 nm or less in the resin composition, and
(iii) the interlayer spacing of the layered silicate (component B) in the resin composition is smaller than the interlayer spacing of the layered silicate alone by 0.5 nm or more; and
(C) 0 to 50 parts by weight of a compound (component C) having affinity for the noncrystalline thermoplastic resin component as the component A and a hydrophilic component; and
molded articles thereof.

According to the present invention, a noncrystalline thermoplastic resin composition having excellent stiffness, surface appearance and heat stability, especially a polycarbonate resin composition and molded articles thereof are obtained.

37 Claims, 1 Drawing Sheet

THERMOPLASTIC RESIN COMPOSITION, MOLDED ARTICLE, AND PROCESS FOR PRODUCING THE SAME

FIELD OF THE INVENTION

The present invention relates to a thermoplastic resin composition comprising a noncrystalline thermoplastic resin and a layered silicate, particularly an organo-modified layered silicate which is contained in a specific dispersion structure and to resin molded articles thereof. Specifically, it relates to a thermoplastic resin composition comprising an aromatic polycarbonate resin and an organo-modified layered silicate which is contained in a specific dispersion structure and to resin molded articles thereof.

DESCRIPTION OF THE PRIOR ART

Attempts have recently been made on polyamide resins and polyolefin resins in particular to improve their mechanical properties while keeping the good surface appearances and specific gravities of their molded products by facilitating the dispersion of a clay mineral, particularly a layered silicate as an inorganic filler into the resins by exchanging ions between layers of the inorganic filler with organic onium ions. Some of them have already been commercialized.

Attempts to improve dispersibility in an aromatic polycarbonate resin composition by devising an organic onium ion and a mixing method are proposed by JP-A 03-215558, JP-A 07-207134, JP-A 07-228762, JP-A 07-331092, JP-A 09-143359 and JP-A 10-60160 (the term "JP-A" as used herein means an "unexamined published Japanese patent application").

Particularly, JP-A 07-207134 discloses a layered silicate comprising an organic onium ion having an alkyl group with 12 or more carbon atoms as a guest. JP-A 07-228762 teaches that a molded article of a resin composition obtained from a layered silicate comprising an organic onium ion having a PEG chain as a guest has an excellent surface appearance.

JP-A 09-143359 discloses that the interlayer spacing of a layered silicate is wide in a resin composition. Further, JP-A 2000-239397 discloses a sheet made from an aromatic polycarbonate resin and a layered silicate prepared by a specific production method and produced by extrusion molding, in which the layered silicate is well dispersed in the sheet in the form of 1 to 5 layers.

However, these aromatic polycarbonate resin compositions containing such a layered silicate finely dispersed therein are of little practical use because they are all unsatisfactory in terms of heat stability. That is, there is not obtained yet a thermoplastic resin composition which has a surface appearance as good as a resin alone without containing an inorganic filler, stiffness equivalent to a resin reinforced by a reinforcing filler sufficiently high heat stability for practical use and which comprises a noncrystalline thermoplastic resin.

SUMMARY OF THE INVENTION

It is an object of the present invention which has been made in view of the above problem to provide a noncrystalline thermoplastic resin composition which comprises a layered silicate finely dispersed therein to such an extent that is not attained in the prior art and which has excellent stiffness, a good surface appearance (surface smoothness) and high heat stability, especially a thermoplastic resin composition comprising an aromatic polycarbonate resin.

The inventors of the present invention have conducted intensive studies to attain the above object and have found that the above problem can be solved by finely dispersing a layered silicate in a noncrystalline thermoplastic resin, especially an aromatic polycarbonate resin to reduce the spacing between layers of the layered silicate to a value smaller than that before dispersion, that is, creating an excellent dispersion state which cannot be attained by a conventional resin composition comprising a layered silicate Thus, the inventors of the present invention have accomplished the present invention based on this finding.

Means for Solving the Problem

According to researches conducted by the inventors of the present invention, there are provided the following resin compositions (1), (2) and (3).

(1) A thermoplastic resin composition (may be referred to as "resin composition-I" hereinafter) comprising:

(A) 100 parts by weight of a noncrystalline thermoplastic resin component (component A);

(B) 0.1 to 50 parts by weight of a layered silicate (component B) which satisfies the following (i) to (iii):

(i) it has a cation exchange capacity of 50 to 200 milliequivalents/100 g, and at least 40% of the cation exchange capacity being exchanged with an organic onium ion, (ii) 60% or more of the layered silicate particles have a thickness of 100 nm or less in the resin composition, and (iii) the interlayer spacing of the layered silicate (component B) in the resin composition is smaller than the interlayer spacing of the layered silicate alone by 0.5 nm or more; and (C) 0 to 50 parts by weight of a compound (component C) having affinity for the noncrystalline thermoplastic resin component as the component A and a hydrophilic component.

(2) A polycarbonate resin composition (may be referred to as "resin composition-II" hereinafter) comprising:

(A) 100 parts by weight of a resin component (component A) containing at least 50 wt % of an aromatic polycarbonate resin;

(B) 0.1 to 50 parts by weight of a layered silicate (component B) which satisfies the following (i) and (ii):

(i) it has a cation exchange capacity of 50 to 200 milliequivalents/100 g, and (ii) 60% or more of the layered silicate particles have a thickness of 100 nm or less in the resin composition; and (C) 0.1 to 50 parts by weight of a compound (component C) having affinity for the aromatic polycarbonate resin and a hydrophilic component.

(3) A polycarbonate resin composition (may be referred to as "resin composition-III" hereinafter) comprising:

(A) 100 parts by weight of a resin component (component A) containing at least 50 wt % of an aromatic polycarbonate resin;

(B) 0.1 to 50 parts by weight of a layered silicate (component B) which satisfies the following (i) to (iii):

(i) it has a cation exchange capacity of 50 to 200 milliequivalents/100 g, and at least 40% of the cation exchange capacity being exchanged with an organic onium ion, (ii) 60% or more of the layered silicate particles have a thickness of 100 nm or less in the resin composition, and (iii) the interlayer spacing of the layered silicate (component B) in the resin composition is smaller than the interlayer spacing of the layered silicate alone by 0.5 nm or more; and (C) 0 to 50 parts by weight of a compound (component C) having affinity for the aromatic polycarbonate resin and a hydrophilic component.

The resin compositions of the present invention will be described in detail hereinbelow.

In the following description, the resin compositions-I, II and III are generically called "resin composition".

Examples of the noncrystalline thermoplastic resin (component A) in (1) the resin composition-I of the present invention include polystyrene, acrylic resin, AS resin (resin essentially composed of an acrylonitrile-styrene copolymer), SMA resin (resin essentially composed of a styrene-maleic anhydride copolymer), MS resin (resin essentially composed of a methyl methacrylate-styrene copolymer), ABS resin (resin essentially composed of an acrylonitrile-styrene-butadiene copolymer), and noncrystalline engineering plastics such as aromatic polycarbonate resins.

The noncrystalline thermoplastic resin more preferred in the present invention is a noncrystalline thermoplastic resin having a glass transition temperature (Tg) of 120° C. or higher. Tg is preferably 130° C. or higher, more preferably 140° C. or higher. Tg is suitably 280° C. or lower, preferably 250° C. or lower. Since the noncrystalline thermoplastic resin having high Tg needs a high molding temperature, the improvement of its heat stability is desired. The glass transition temperature in the present invention is measured by a method specified in JIS K7121.

Preferred examples of the above noncrystalline thermoplastic resin include aromatic polycarbonate resins, polyphenylene oxide resins, polysulfone resins, polyether sulfone resins, polyarylate resins, polycyclic olefin resins, polyetherimide resins, polyamide-imide resin, polyimide resins and polyaminobismaleimide resins. Out of these, aromatic polycarbonate resins, polyarylate resins and polycyclic olefin resins are more preferred because they have excellent moldability and can be used in a wide variety of fields. Out of these, an aromatic polycarbonate resin having excellent mechanical strength is particularly preferred as the noncrystalline thermoplastic resin of the present invention. The aromatic polycarbonate resin may be used alone or blended with one or more other thermoplastic resins such as ABS resin and aromatic polyester resin.

The aromatic polycarbonate resin which is particularly preferred as the noncrystalline thermoplastic resin as the component A in the resin composition-I of the present invention and used as the component A in the resin composition-II and resin composition-III will be described hereinbelow.

A typical aromatic polycarbonate resin is obtained by reacting a diphenol with a carbonate precursor. The reaction method is selected from an interfacial condensation method, melt ester exchange method, the solid-phase ester exchange method of a carbonate prepolymer, the ring-open polymerization method of a cyclic carbonate compound and the like.

Typical examples of the diphenol include hydroquinone, resorcinol, 4,4'-biphenol, 1,1-bis(4-hydroxyphenyl)ethane, 2,2-bis(4-hydroxyphenyl)propane (so-called bisphenol A), 2,2-bis(4-hydroxy-3-methylphenyl)propane, 2,2-bis(4-hydroxyphenyl)butane, 1,1-bis(4-hydroxyphenyl)-1-phenylethane, 1,1-bis(4-hydroxyphenyl)cyclohexane, 1,1-bis(4-hydroxyphenyl)-3,3,5-trimethylcyclohexane, 2,2-bis(4-hydroxyphenyl)pentane, 4,4'-(p-phenylenediisopropylidene)diphenol, 4,4'-(m-phenylenediisopropylidene)diphenol, 1,1-bis(4-hydroxyphenyl)-4-isopropylcyclohexane, bis(4-hydroxyphenyl)oxide, bis(4-hydroxyphenyl)sulfide, bis(4-hydroxyphenyl)sulfoxide, bis(4-hydroxyphenyl)sulfone, bis(4-hydroxyphenyl)ketone, bis(4-hydroxyphenyl)ester, 2,2-bis(3,5-dibromo-4-hydroxyphenyl)propane, bis(3,5-dibromo-4-hydroxyphenyl)sulfone, bis(4-hydroxy-3-methylphenyl)sulfide, 9,9-bis(4-hydroxyphenyl)fluorene and 9,9-bis(4-hydroxy-3-methylphenyl)fluorene. The diphenol is preferably bis(4-hydroxyphenyl)alkane, particularly preferably bisphenol A from the viewpoint of impact resistance.

As the carbonate precursor is used a carbonyl halide, carbonate ester or haloformate, specifically phosgene, diphenyl carbonate or dihaloformate of a diphenol.

To produce a polycarbonate resin from the above diphenol and carbonate precursor by the interfacial polymerization method, a catalyst, terminal capping agent and antioxidant for preventing the oxidation of the diphenol may be used as required. The polycarbonate resin of the present invention includes a branched polycarbonate resin comprising a polyfunctional aromatic compound having a functionality of 3 or more, polyester carbonate resin comprising an aromatic or aliphatic (including alicyclic) bifunctional carboxylic acid, copolycarbonate resin comprising a bifunctional alcohol (including alicyclic), and polyester carbonate resin comprising a bifunctional carboxylic acid and a bifunctional alcohol. The polycarbonate resin may be a mixture of two or more of the obtained polycarbonate resins.

As the polyfunctional aromatic compound having a functionality of 3 or more may be used 1,1,1-tris(4-hydroxyphenyl)ethane or 1,1,1-tris(3,5-dimethyl-4-hydroxyphenyl)ethane.

When a polyfunctional compound which forms a branched polycarbonate is contained, its amount is 0.001 to 1 mol %, preferably 0.005 to 0.9 mol %, particularly preferably 0.01 to 0.8 mol % based on the total weight of the aromatic polycarbonate(s). In the case of the melt ester exchange method, a branched structure may be formed as a side reaction. The amount of the branched structure is 0.001 to 1 mol %, preferably 0.005 to 0.9 mol %, particularly preferably 0.01 to 0.8 mol % based on the total weight of the aromatic polycarbonate(s). The amount can be calculated by $^1$H-NMR measurement.

The aliphatic bifunctional carboxylic acid is preferably an α,ω-dicarboxylic acid. Examples of the aliphatic bifunctional carboxylic acid include linear saturated aliphatic dicarboxylic acids such as sebacic acid (decanedioic acid), dodecanedioic acid, tetradecanedioic acid, octadecanedioic acid and icosanic diacid; and alicyclic dicarboxylic acids such as cyclohexanedicarboxylic acid. The bifunctional alcohol is more preferably an alicyclic diol such as cyclohexane dimethanol, cyclohexane diol or tricyclodecane dimethanol.

Further, a polycarbonate-polyorganosiloxane copolymer comprising a polyorganosiloxane unit may also be used.

The aromatic polycarbonate resin may be a mixture of two or more aromatic polycarbonates such as polycarbonates obtained from different diphenols, polycarbonates containing a branched component, polyester carbonates and polycarbonate-polyorganosiloxane copolymers. Further, a mixture of two or more of polycarbonates produced by the following different production methods and polycarbonates containing different terminal capping agents may also be used.

The polymerization reaction of an aromatic polycarbonate which is carried out by the interfacial polycondensation method is generally a reaction between a diphenol and phosgene in the presence of an acid binder and an organic solvent. Examples of the acid binder include alkali metal hydroxides such as sodium hydroxide and potassium hydroxide and amine compounds such as pyridine. Examples of the organic solvent include hydrocarbon halides such as methylene chloride and chlorobenzene. A catalyst such as a tertiary amine, quaternary ammonium compound or quaternary phosphonium compound exemplified by triethylamine, tetra-n-butylammonium bromide and tetra-n-butylphosphonium bromide may be used to promote the reaction. The reaction temperature is generally 0 to 40° C., the reaction time is about 10 minutes to 5 hours, and pH during the reaction is preferably maintained at 9 or more.

A terminal capping agent is generally used in the above polymerization reaction. A monofunctional phenol may be used as the terminal capping agent. Examples of the monofunctional phenol include monofunctional phenols such as phenol, p-tert-butylphenol and p-cumylphenol. The monofunctional phenols further include decyl phenol, dodecyl phenol, tetradecyl phenol, hexadecyl phenol, octadecyl phenol, eicosyl phenol, docosyl phenol and triacontyl phenol. These terminal capping agents may be used alone or in combination of two or more.

The reaction which is carried out by the melt ester exchange method is generally an ester exchange reaction between a diphenol and a carbonate ester and carried out by mixing the diphenol and the carbonate ester in the presence of an inert gas under heating and distilling out the formed alcohol or phenol. The reaction temperature which differs according to the boiling point or the like of the formed alcohol or phenol is generally 120 to 350° C. The pressure of the reaction system is reduced to about $1.33 \times 10^3$ to 13.3 Pa in the latter stage of the reaction in order to make it easy to distill out the formed alcohol or phenol. The reaction time is generally about 1 to 4 hours.

The carbonate ester is an ester such as an aryl group having 6 to 10 carbon atoms, aralkyl group or alkyl group having 1 to 4 carbon atoms, all of which may be substituted. Out of these, diphenyl carbonate is preferred.

A polymerization catalyst may be used to accelerate the polymerization rate. Examples of the polymerization catalyst include alkali metal compounds such as sodium hydroxide, potassium hydroxide and sodium salts and potassium salts of a diphenol; alkali earth metal compounds such as calcium hydroxide, barium hydroxide and magnesium hydroxide; and nitrogen-containing basic compounds such as tetramethylammonium hydroxide, tetraethylammonium hydroxide, trimethylamine and triethylamine. Further, alkoxides of an alkali (earth) metal, organic acid salts of an alkali (earth) metal, boron compounds, germanium compounds, antimony compounds, titanium compounds and zirconium compounds all of which are generally used for an esterification reaction and ester exchange reaction may also be used. The above catalysts may be used alone or in combination of two or more. The amount of the polymerization catalyst is preferably $1 \times 10^{-8}$ to $1 \times 10^{-3}$ equivalent, more preferably $1 \times 10^{-7}$ to $5 \times 10^{-4}$ equivalent based on 1 mol of the raw material diphenol.

To reduce the number of the phenolic terminal groups in the melt ester exchange reaction, a compound such as 2-chlorophenylphenyl carbonate, 2-methoxycarbonylphenylphenyl carbonate or 2-ethoxycarbonylphenylphenyl carbonate may be added in the latter stage or at the end of the polycondensation reaction.

In the melt ester exchange method, a deactivator for neutralizing the activity of a catalyst is preferably used. The amount of the deactivator is preferably 0.5 to 50 mols based on 1 mol of the residual catalyst. It is preferably 0.01 to 500 ppm, more preferably 0.01 to 300 ppm, particularly preferably 0.01 to 100 ppm based on the polycarbonate after polymerization. Preferred examples of the deactivator include phosphonium salts such as tetrabutylphosphonium dodecylbenzene sulfonate and ammonium salts such as tetraethylammonium dodecylbenzyl sulfate.

The viscosity average molecular weight of the aromatic polycarbonate resin is not particularly limited. However, when the viscosity average molecular weight is lower than 10,000, strength and the like deteriorate and when the viscosity average molecular weight is higher than 50,000, moldability lowers. Therefore, it is preferably 10,000 to 50,000, more preferably 12,000 to 30,000, particularly preferably 15,000 to 28,000. It is naturally possible to mix an aromatic polycarbonate resin having a viscosity average molecular weight outside the above range. That is, an aromatic polycarbonate component having a viscosity average molecular weight of more than 50,000 may be contained.

The viscosity average molecular weight M in the present invention is obtained by calculating a specific viscosity from the following equation using a solution containing 0.7 g of an aromatic polycarbonate dissolved in 100 ml of methylene chloride at 20° C. and an Ostwald's viscometer:

Specific viscosity $(\eta_{sp})=(t-t_0)/t_0$ wherein $t_0$ is the time (number of seconds) required for dropping methylene chloride and t is the time (number of seconds) required for dropping a sample solution, and by inserting the obtained specific viscosity into the following equation:

$\eta_{sp}/c=[\eta]+0.45\times[\eta]^2 c$ ([$\eta$] represents an intrinsic viscosity)

$[\eta]=1.23\times10^{-4}M^{0.83}$ $c=0.7$

To measure the viscosity average molecular weight of the resin composition of the present invention, the following procedure is taken. That is, the composition is dissolved in methylene chloride in a weight ratio of 1:20 to 1:30, and its soluble content is collected by filtration with cerite and fully dried by removing the solution to obtain a methylene chloride-soluble solid. The specific viscosity at 20° C. of the resin composition of the present invention is obtained from the above equation using a solution containing 0.7 g of the solid dissolved in 100 ml of methylene chloride and an Ostwald's viscometer.

The component B of the present invention is a layered silicate having a cation exchange capacity of 50 to 200 milliequivalents/100 g. In the present invention, the component B of the present invention is more preferably a layered silicate having a cation exchange capacity of 50 to 200 milliequivalents/100 g, 40% or more of which is exchanged with an organic onium ion. The "layered silicate having a cation exchange capacity and an organic onium ion exchanged between layers" may be simply referred to as "organo-modified layered silicate". It is desired that 50% or more, particularly 60% or more of the cation exchange capacity of the component B be exchanged with an organic onium ion.

The layered silicate as the component B is a silicate or clay composed of layers consisting of a combination of a $SiO_4$ tetrahedral sheet structure made from a $SiO_2$ chain and an octahedral sheet structure containing Al, Mg, Li and the like and having an exchangeable cation between the layers. The silica or clay is typically a smectite-based mineral, vermiculite, halloysite or swelling mica. Their specific examples include smectite-based minerals such as montmorillonite, hectorite, fluorine hectroite, saponite, beidellite and stevensite, and swelling micas such as Li fluorine taeniolite, Na fluorine taeniolite, Na tetrasilicon fluorine mica and Li tetrasilicon fluorine mica, all of which are synthetic swelling micas. These layered silicates may be natural or synthesized. Synthetic products can be obtained by hydrothermal synthesis, melt synthesis or solid reaction.

The cation exchange capacity of the layered silicate must be 50 to 200 milliequivalents/100 g, preferably 80 to 150 milliequivalents/100 g, more preferably 100 to 150 milliequivalents/100 g. The cation exchange capacity is measured as a CEC value by an improved Schöllenberger method which is a national official method as a standard soil analytical method. The cation exchange capacity of the layered silicate must be 50 milliequivalents/100 g or more to achieve high dispersibility in a noncrystalline thermoplastic resin, particularly an aromatic polycarbonate resin. When the cation exchange capacity is larger than 200 milliequivalents/100 g, the thermal deterioration of a noncrystalline thermoplastic resin becomes large and particularly the thermal deterioration of an aromatic polycarbonate resin preferred in the present invention becomes large.

PH of the layered silicate is preferably 7 to 10. When pH is higher than 10, the heat stability of an aromatic polycarbonate resin preferred in the present invention tends to be lowered.

Out of these layered silicates, smectite-based clay minerals such as montmorillonite and hectorite, and swelling fluorine micas such as Li fluorine taeniolite, Na fluorine taeniolite and Na tetrasilicon fluorine mica are preferred from the viewpoint of cation exchange capacity, and montmorillonite obtained by purifying bentonite and synthetic fluorine micas are more preferred from the viewpoint of purity. Synthetic fluorine micas having excellent mechanical properties are particularly preferred.

The layered silicate as the component B is preferably such that an organic onium ion is exchanged between layers of the layered silicate. The organic onium ion is generally treated as a salt with a halogen ion. Examples of the organic onium ion include ammonium ion, phosphonium ion, sulfonium ion and onium ion derived from a hetero aromatic ring. The onium ion may be primary, secondary, tertiary or quaternary, out of which a quaternary onium ion is preferred. Ammonium ion and phosphonium ion are preferred as the onium ion.

The ion compound may have an organic group bonded thereto. Although an alkyl group is a typical organic group, the ion compound may have an aromatic group or a functional group such as ether group, ester group, double bond moiety, triple bond moiety, glycidyl group, carboxylic acid group, anhydride group, hydroxyl group, amino group, amido group or oxazoline group.

Specific examples of the organic onium ion include quaternary ammoniums having the same alkyl groups such as tetraethyl ammonium and tetrabutyl ammonium; trimethyl alkyl ammoniums such as trimethyl octyl ammonium, trimethyl decyl ammonium, trimethyl dodecyl ammonium, trimethyl tetradecyl ammonium, trimethyl hexadecyl ammonium, trimethyl octadecyl ammonium and trimethyl icosanyl ammonium; trimethyl alkenyl ammoniums such as trimethyl octadecenyl ammonium; trimethyl alkadienyl ammoniums such as trimethyl octadecadienyl ammonium; triethyl alkyl ammoniums such as triethyl dodecyl ammonium, triethyl tetradecyl ammonium, triethyl hexadecyl ammonium and triethyl octadecyl ammonium; tributyl alkyl ammoniums such as tributyl dodecyl ammonium, tributyl tetradecyl ammonium, tributyl hexadecyl ammonium and tributyl octadecyl ammonium; dimethyl dialkyl ammoniums such as dimethyl dioctyl ammonium, dimethyl didecyl ammonium, dimethyl ditetradecyl ammonium, dimethyl dihexadecyl ammonium and dimethyl dioctadecyl ammonium; dimethyl dialkenyl ammoniums such as dimethyl dioctadecenyl ammonium; dimethyl dialkadienyl ammoniums such as dimethyl dioctadecadienyl ammonium; diethyl dialkyl ammoniums such as diethyl didodecyl ammonium, diethyl ditetradecyl ammonium, diethyl dihexadecyl ammonium and diethyl dioctadecyl ammonium; dibutyl dialkyl ammoniums such as dibutyl didodecyl ammonium, dibutyl ditetradecyl ammonium, dibutyl dihexadecyl ammonium and dibutyl dioctadecyl ammonium; methylbenzyl dialkyl ammoniums such as methylbenzyl dihexadecyl ammonium; dibenzyl dialkyl ammoniums such as dibenzyl dihexadecyl ammonium; trialkylmethyl ammonium such as trioctylmethyl ammonium, tridodecylmethyl ammonium and tritetradecylmethyl ammonium; trialkylethyl ammoniums such as trioctylethyl ammonium and tridodecylethyl ammonium; trialkylbutyl ammoniums such as trioctylbutyl ammonium and tridecylbutyl ammonium; quaternary ammoniums having an aromatic ring such as trimethylbenzyl ammonium; quaternary ammoniums derived from an aromatic amine such as trimethylphenyl ammonium; trialkyl[PAG]ammoniums such as methyldiethyl[PEG]ammonium and methyldiethyl[PPG]ammonium: dialkylbis[PAG]ammoniums such as methyldimethylbis[PEG]ammonium; alkyltris[PAG]ammoniums such as ethyltris[PEG]ammonium, and phosphonium ions obtained by substituting the nitrogen atom of the above ammonium ions by a phosphorus atom. These organic onium ions may be used alone or in combination of two or more. The above "PEG" stands for polyethylene glycol, "PPG" stands for polypropylene glycol and "PAG" stands for polyalkylene glycol. The molecular weight of polyalkylene glycol is 100 to 1,500.

These organic onium ion compounds have a molecular weight of preferably 100 to 600, more preferably 150 to 500. When the molecular weight is higher than 600, the thermal deterioration of a noncrystalline thermoplastic resin such as an aromatic polycarbonate resin may be promoted or the heat resistance of a resin composition may be impaired. The molecular weight of the organic onium ion indicates the molecular weight of an organic onium ion alone without including a counter ion such as a halogen ion. The organic onium ion preferably has at least one alkyl group having 6 to 20 carbon atoms or aryl group having 6 to 12 carbon atoms as an organic group forming the organic onium ion. Particularly preferably, the organic groups forming the organic onium ion are alkyl groups having 10 or less carbon atoms at least one of which is an alkyl group having 6 to 10 carbon atoms. Use of an alkyl group having 6 to 10 carbon atoms as at least one of the alkyl groups contained in the organic onium ion compound structure is preferred for the suppression of the thermal deterioration of a noncrystalline thermoplastic resin such as an aromatic polycarbonate resin. Particularly preferably, the organic onium ion compound has an alkyl group having 6 to 8 carbon atoms to disperse the layered silicate well.

Preferred examples of the organic onium ion include trimethyl-n-octylammonium, trimethyl-n-decylammonium, trimethyl-n-dodecylammonium, trimethyl-n-hexadecylammonium, trimethyl-n-octadecylammonium, methyl tri-n-octylammonium, ethyl tri-n-octylammonium, butyl tri-n-octylammonium, triphenylmethylammonium, trimethyl-n-octylphosphonium, trimethyl-n-decylphosphonium, trimethyl-n-dodecylphosphonium, trimethyl-n-hexadecylphosphonium, trimethyl-n-octadecylphosphonium, methyl tri-n-octylphosphonium, ethyl tri-n-octylphosphonium, butyl tri-n-octylphosphonium and triphenylmethyl phosphonium.

The ion exchange of the layered silicate with an organic onium ion can be carried out by adding the organic onium ion compound to a layered silicate dispersed in a polar solvent and collecting the precipitated ion exchanged compound. In general, this ion exchange reaction is carried out by adding an organic onium ion compound in an amount of 1.0 to 1.5 equivalents based on 1 equivalent of the ion exchange capacity of the layered silicate to exchange almost all the metal ions between layers with an organic onium ion. However, it is expected that control of the exchange rate based on the ion exchange capacity is also effective in suppressing the thermal deterioration of a noncrystalline thermoplastic resin such as an aromatic polycarbonate resin. The ion exchange rate of the organic onium ion is preferably 40% or more based on the ion exchange capacity of the layered silicate. The ion exchange rate is more preferably 40 to 95%, particularly preferably 40 to 80%.

The ion exchange rate of the organic onium ion can be calculated by obtaining a reduction in the weight of the compound after ion exchange caused by the thermal decomposition of the organic onium ion with a thermogravimeter.

As for the ratio of the layered silicate used as the component B in the present invention to the component A, the amount of the component B is 0.1 to 50 parts by weight, preferably 0.5 to 20 parts by weight, more preferably 0.5 to 10 parts by weight based on 100 parts by weight of the component A. When this amount is smaller than 0.1 part by weight, the effect of improving the mechanical properties of the noncrystalline thermoplastic resin such as an aromatic polycarbonate resin is not seen and when the amount is larger than 50 parts by weight, the heat stability of the composition lowers, thereby making it difficult to obtain a resin composition of practical use value.

The resin composition of the present invention comprises predetermined amounts of the above components A and B. The component B has (i) a cation exchange capacity of 50 to 200 milliequivalents/100 g and at least 40% of the cation exchange capacity is preferably exchanged with an organic onium ion. More preferably, (ii) 60% or more of the component B particles have a thickness of 100 nm or less in the resin composition, and (iii) the interlayer spacing of the layered silicate as the component B in the resin composition is smaller than the interlayer spacing of the layered silicate alone as the component B by 0.5 nm or more. The above feature (iii) is that the interlayer spacing of the layered silicate in the resin composition containing an organo-modified layered silicate is smaller than the interlayer spacing of the organo-modified layered silicate alone by a predetermined value or more.

The above feature (ii) can be confirmed from a transmission electron photomicrograph of a thermoplastic resin composition (or molded product thereof). That is, a sample having a thickness of 50 to 100 nm is obtained from the thermoplastic resin composition (or molded product) using a microtome and observed at a magnification of about ×10,000. The thickness of the layered silicate is measured by the image analysis of the photomicrograph to obtain information on the above feature (ii).

As for the above feature (ii), it is preferred that 70% or more of the component B particles should have a thickness of 100 nm or less in the resin composition and more preferred that 80% or more of the component B particles should have a thickness of 100 nm or less. When the proportion of the component B particles having a thickness of 100 nm or less is lower than 60%, excellent surface smoothness and stiffness which are the features of the present invention are not obtained disadvantageously.

The above feature (iii) is confirmed from the diffraction angle of a diffraction line in X-ray diffraction measurement according to Bragg conditions. The interlayer spacing of a layered silicate and X-ray diffraction measurement are described in "Clay Handbook" (edited by the Japan Clay Association: published by Gihodo Co., Ltd.), for example. To carry out the X-ray diffraction measurement of an organo-modified layered silicate, a powdery sample is filled in a sample vessel to be measured. To carry out the X-ray diffraction measurement of a layered silicate in a resin composition (or molded product thereof), the composition is molded into a flat board by injection molding or extrusion molding and this sample is placed in the opening of the sample vessel such that its flat portion becomes flush with the measurement reference plane to be measured.

The above feature (iii) that the interlayer spacing of the layered silicate as the component B in the resin composition is smaller than the interlayer spacing of the layered silicate alone as the component B means that the diffraction angle (2θ) of a diffraction peak derived from the interlayer spacing in the X-ray diffraction measurement of the interlayer spacing of the layered silicate becomes large. Specifically, in the above feature (iii), the interlayer spacing of the layered space as the component B in the resin composition is smaller than the interlayer spacing of the layered silicate alone as the component B by preferably 0.5 nm or more, more preferably 0.7 nm or more. The upper limit is preferably 1.5 nm, more preferably 1.2 nm.

The layered silicate is exfoliated and is finely dispersed between layers to a certain degree in the resin composition. As a result, the diffraction peak in the above resin may include a component having an increased spacing between layers (diffraction angle is smaller than the diffraction angle of the component B alone). The thermoplastic resin composition of the present invention may have a diffraction peak having an increased spacing between layers when the component B has the above feature (iii). However, the intensity (In) of a diffraction peak derived from a layered silicate whose spacing between layers is smaller than when the component B is alone is preferably higher than the intensity (Ib) of a diffraction peak derived from a layered silicate whose spacing between layers is larger than when the component B is alone. The ratio Ib/In is preferably 0.5 or less, more preferably 0.1 or less. Ib/In can be "0" when another diffraction peak is not seen.

The thermoplastic resin composition of the present invention which has excellent stiffness, surface appearance (surface smoothness) and heat stability is obtained by finely dispersing an organo-modified layered silicate (above feature (ii)) and reducing the spacing between layers of the organo-modified layered silicate (above feature (iii)). It is considered that especially the above feature (iii) greatly contributes to the heat stability of the thermoplastic resin composition. That is, the reason why the thermoplastic resin composition of the present invention has excellent heat stability is presumed to be that an ion component existent between layers remains in the inside of the layered silicate without being exposed to the outside due to mutual attraction between layers of the layered silicate. The ion component is considered as a factor for promoting the deterioration of a base resin such as an aromatic polycarbonate resin.

A conventional resin composition obtained by finely dispersing a layered silicate in a resin such as an aromatic polycarbonate resin is aimed to finely disperse an organo-modified layered silicate in a base resin as much as possible simply by exfoliating the organo-modified layered silicate in a portion between layers. Therefore, heat stability of practical level is not taken into consideration or not satisfactory in most cases. In the present invention, both performance based on excellent dispersibility and practical utility such as heat stability can be obtained by using the method of reducing the spacing between layers based on the technical concept described in the above presumption part.

The following methods can be employed to achieve the above feature (iii) in the present invention.

(1) A component which enables layers to be attracted by each other is introduced between these layers to reduce the spacing between the layers (blending a third component).

(2) Organizing agents which are introduced between layers are reacted with each other to attract the layers by each other so as to reduce the spacing between the layers.

Exposure to an electron beam or radiation is used in the above reaction methods. Exposure at a low temperature is particularly preferred. The method (1) is simple and preferred. The methods (1) and (2) may be carried out before the component B is mixed with the component A or when the component B is mixed with the component A. The method which is carried out before the component B is mixed with the component A is more preferred.

The third component in the above method (1) is preferably a compound which has affinity for the noncrystalline thermoplastic resin as the component A (such as a polycarbonate resin) and a hydrophilic component. Therefore, it is advantageous that the resin composition of the present invention should further comprise (C) 50 parts or less by weight, preferably 0.1 to 50 parts by weight of a compound (component C) having affinity for the noncrystalline thermoplastic resin as the component A and a hydrophilic component per 100 parts by weight of component A.

The component C of the present invention is a compound which has affinity for the noncrystalline thermoplastic resin (component A) and a hydrophilic component. The component C become to have excellent affinity for both the noncrystalline thermoplastic resin and the layered silicate, particularly an organo-modified layered silicate. The affinity for the noncrystalline thermoplastic resin and the layered silicate, particularly an organo-modified layered silicate, improves compatibility between the two components so that the layered silicate disperses in the noncrystalline thermoplastic resin finely and stably. Further, it is considered that the hydrophilic component of the component C neutralizes the electric resiliency between layers of the layered silicate by its polar function or absorbs a charge between the layers to reduce the spacing between the layers.

The component C's function of dispersing the organo-modified layered silicate is considered the same as a polymer alloy compatibilizer used to compatibilize different polymers. Therefore, the component C is preferably a polymer rather than a low-molecular weight compound. The polymer is also excellent in heat stability at the time of melt processing. The average number of the recurring units of the polymer must be 2 or more, preferably 5 or more, more preferably 10 or more. The upper limit of the number average molecular weight of the polymer is preferably 2,000,000. When the number average molecular weight is not higher than the above upper limit, excellent moldability is obtained.

When the component C of the present invention is a polymer, its basic structure may be one of the following structures (i) and (ii).

Structure (i): When the component having affinity for the noncrystalline thermoplastic resin is represented by $\alpha$ and the hydrophilic component is represented by $\beta$, the polymer is a graft copolymer comprising $\alpha$ and $\beta$ (the main chain is $\alpha$ and a graft chain is $\beta$, or the main chain is $\beta$ and a graft chain is $\alpha$), a block copolymer comprising $\alpha$ and $\beta$ (the number of block segments can be 2 or more such as di- or tri-, including a radial block type), or a random copolymer comprising $\alpha$ and $\beta$. $\alpha$ and $\beta$ may be each a single polymer or copolymer.

$\alpha$ and $\beta$ each represent a polymer segment unit or monomer unit. The component $\alpha$ is preferably a polymer segment unit from the viewpoint of affinity for the noncrystalline thermoplastic resin.

Structure (ii): When the component having affinity for the noncrystalline thermoplastic resin is represented by $\alpha$ and the hydrophilic component is represented by $\beta$, the polymer is a polymer having a structure in which the function of $\alpha$ is developed by the entire polymer and $\beta$ is included in $\alpha$.

That is, although only $\alpha$ does not have satisfactory affinity for the noncrystalline thermoplastic resin, a combination of $\alpha$ and $\beta$ exhibits excellent affinity for the noncrystalline thermoplastic resin. Or only $\alpha$ has satisfactory affinity for the noncrystalline thermoplastic resin and a combination of $\alpha$ and $\beta$ further improves affinity for the noncrystalline thermoplastic resin. This mode is included in the above structure (i). Therefore, the structures (i) and (ii) may partially overlap with each other. The structure (i) may be possibly in a mode that only $\alpha$ has satisfactory affinity for the noncrystalline thermoplastic resin and a combination of $\alpha$ and $\beta$ reduces the affinity for the noncrystalline thermoplastic resin. This mode is included in the component C as a matter of course.

The above structures (i) and (ii) may be selected in the present invention. Particularly, a mode in which both the conditions of the structure (i) and the conditions of the structure (ii) are satisfied, that is, a mode in which only $\alpha$ has high affinity for the noncrystalline thermoplastic resin and the affinity becomes higher in the entire component C comprising both $\alpha$ and $\beta$ is preferred.

A description is subsequently given of the component having affinity for the noncrystalline thermoplastic resin (may be referred to as "$\alpha$" hereinafter) in the component C in the present invention. Since the component C has the same function as a compatibilizer in a polymer alloy as described above, $\alpha$ must have affinity for a polymer like the compatibilizer. Therefore, $\alpha$ is roughly divided into a non-reactive type and a reactive type.

The non-reactive type $\alpha$ has excellent affinity when it has the following factors. That is, it is desired that there should be factors between the noncrystalline thermoplastic resin and $\alpha$, such as (1) similarity in chemical structure, (2) approximation of solubility parameter (the difference of solubility parameter is 1 $(cal/cm^3)^{1/2}$ or less, that is, about 2.05 $(MPa)^{1/2}$ or less), (3) interaction between molecules (hydrogen bond, interaction between ions, etc.), and pseudo-attractive interaction specific to a random polymer. These factors are known as indices for judging affinity between a compatibilizer and a polymer which is the base of a polymer alloy.

The reaction type $\alpha$ includes those known as functional groups having reactivity with the noncrystalline thermoplastic resin in the compatibilizer. Examples of the reactive type α for an aromatic polycarbonate resin which is preferred as the noncrystalline thermoplastic resin include carboxyl group, carboxylic anhydride group, epoxy group, oxazoline group, ester group, ester bond, carbonate group and carbonate bond.

When α has excellent affinity for the noncrystalline thermoplastic resin, it is widely known that a mixture of the noncrystalline thermoplastic resin and α shows a single glass transition temperature (Tg) or that Tg of the noncrystalline thermoplastic resin moves toward Tg of α. A component having the above behavior is one example of the component (α) having affinity in the present invention.

As described above, the component (α) having affinity for the noncrystalline thermoplastic resin in the component C of the present invention can exhibit affinity due to various factors. α is preferably non-reactive type and particularly preferably exhibits excellent affinity due to the approximation of solubility parameter. This is because it is superior to reactive type α in affinity for the noncrystalline thermoplastic resin. When the reactive type α has excessively high reactivity, the thermal deterioration of a polymer is promoted by a side reaction.

The solubility parameter of the noncrystalline thermoplastic resin and the solubility parameter of α in the component C preferably have the following relationship. That is, when the solubility parameter of the noncrystalline thermoplastic resin (component A) is represented by $\delta_A$ $((MPa)^{1/2})$ and the solubility parameter of α in the component C or the solubility parameter of the whole component C is represented by $\delta_\alpha$ $((MPa)^{1/2})$, they preferably have the following relationship.

$$\delta_\alpha = \delta_A \pm 2 \ ((MPa)^{1/2})$$

Since the solubility parameter of an aromatic polycarbonate resin suitable as the component A is generally about 10 $(cal/cm^3)^{1/2}$ (that is, about 20.5 $((MPa)^{1/2})$), $\delta_\alpha$ is preferably 18.5 to 22.5 $((MPa)^{1/2})$, more preferably 19 to 22 $((MPa)^{1/2})$ when the component A is a polycarbonate resin.

A polymer component which has the above solubility parameter $\delta_\alpha$ a for an aromatic polycarbonate resin preferred as the component A is, for example, a polyester-based polymer such as aromatic polycarbonate, aromatic polyester (typified by polyethylene terephthalate, polybutylene terephthalate and cyclohexane dimethanol copolyethylene terephthalate) or aliphatic polyester (typified by polycaprolactone). Specific examples of the polymer include vinyl-based polymers such as styrene polymers, alkyl (meth) acrylate polymers and acrylonitrile polymers (typified by polystyrene, styrene-maleic anhydride copolymer, polymethyl methacrylate, styrene-methyl methacrylate copolymer and styrene-acrylonitrile copolymer). A polymer component having high Tg is preferably used to maintain the heat resistance of the composition of the present invention.

The solubility parameter can be theoretically estimated by group contribution methods using a Small value described in "Polymer Handbook Vol. 4" published by A Wiley-Interscience Publication in 1999. Tg of the noncrystalline thermoplastic resin can be measured by a differential scanning calorimeter (DSC) in accordance with JIS K7121.

The component α having affinity for the noncrystalline thermoplastic resin as the component A is contained in the component C in an amount of preferably 5 wt % or more, more preferably 10 wt % or more, much more preferably 30 wt % or more, particularly preferably 50 wt % or more. Since it is possible that the component C is totally composed of α, the upper limit can be 100 wt %.

A description is subsequently given of the hydrophilic component (may be referred to as "β" hereinafter) of the component C in the present invention. The hydrophilic component is selected from a monomer having a hydrophilic group (organic atomic group having strong interaction with water) and a hydrophilic polymer component (polymer segment). The hydrophilic group is widely known per se. The following groups are given as examples of the hydrophilic group according to Kagaku Daijiten (Chemical Dictionary) (published by Kyoritsu Shuppan Co., Ltd. in 1989).

1) highly hydrophilic groups:
—$SO_3H$, —$SO_3M$, —$OSO_3H$, —$OSO_3H$, —COOM, —$NR_3X$ (R: alkyl group, X: halogen atom, M: alkali metal, —$NH_4$), etc.

2) not so highly hydrophilic groups:
—COOH, —$NH_2$, —CN, —OH, —$NHCONH_2$, etc.

3) groups having low hydrophilic nature:
—$CH_2OCH_3$, —$OCH_3$, —$COOCH_3$, —CS, etc.

Out of the above groups 1) to 3), hydrophilic groups classified into 1) and 2) are used as the hydrophilic group in the present invention. Besides the above examples, a sulfine group is included in the highly hydrophilic groups 1), and carboxylic anhydride group, oxazoline group, formyl group and pyrrolidone group are included in the not so highly hydrophilic groups 2).

The groups 2) are preferred because they have excellent heat stability when the noncrystalline thermoplastic resin, particularly an aromatic polycarbonate resin preferred in the present invention is molten. When the hydrophilic nature is too high, the thermal deterioration of the aromatic polycarbonate readily occurs. This is because the hydrophilic group reacts with a carbonate bond directly, thereby causing a thermal decomposition reaction.

The hydrophilic group of the present invention includes monovalent hydrophilic groups and hydrophilic groups having a valence of 2 or more. When the component C is a polymer, the functional group having a valence of 2 or more does not form the main chain and what forms the main chain is discriminated from a functional group as a bond. Stated more specifically, a group added to an atom such as carbon forming the main chain, the group of a side chain and a group at the terminal of a molecular chain are each a functional group even if the group has a valence of 2 or more.

A more specific index for the hydrophilic group is solubility parameter. It is widely known that as the value of solubility parameter increases, hydrophilic nature becomes higher. The solubility parameter of each group can be calculated from the cohesion energy ($E_{coh}$) of each group and the molar volume (V) of each group specified by Fedors ("Polymer Handbook vol. 4") (A WILEY-INTERSCIENCE PUBLICATION), VII, pp. 685, 1999 or Polym. Eng. Sci., vol. 14, pp. 147 and 472, 1974). The above calculation method is simple and widely known. A numerical value ($E_{coh}/V$: unit will be "$J/cm^3$" hereinafter) obtained by dividing the cohesion energy ($E_{coh}$) by the molar volume (V) can be used as an index of hydrophilic nature when only value of hydrophilic nature is compared.

The hydrophilic group contained in β in the component C of the present invention must have an $E_{coh}/V$ of 600 or more. $E_{coh}/V$ is preferably 800 or more. When it is 800 or more, it exceeds $E_{coh}/V$ of a carbonate bond in an aromatic polycarbonate resin preferred as the component A of the present invention. That is, it has higher hydrophilic nature than the carbonate bond. Further, $E_{coh}/V$ is more preferably 900 or more, much more preferably 950 or more.

As described above, when the hydrophilic nature is too high, the thermal deterioration of an aromatic polycarbonate resin preferred in the present invention readily occurs. Therefore, $E_{coh}/V$ is preferably 2,500 or less, more preferably 2,000 or less, particularly preferably 1,500 or less.

A hydrophilic polymer component (polymer segment) is also selected as the hydrophilic component (β) of the component C. Therefore, the hydrophilic polymer segment contained in the polymer of the component C is β. Examples of the hydrophilic polymer which are widely known include polyalkylene oxides, polyvinyl alcohols, polyacrylic acids, polyacrylic acid metal salts (including chelate type), polyvinyl pyrrolidone, polyacrylamide and polyhydroxyethyl methacrylate. Out of these, polyalkylene oxides, polyvinyl alcohols, polyacrylic acids, polyvinyl pyrrolidone and polyhydroxyethyl methacrylate are preferred. They have excellent hydrophilic nature and heat stability (suppression of the decomposition of an aromatic polycarbonate at the time of melt processing) for an aromatic polycarbonate resin preferred in the present invention. Polyethylene oxide and polypropylene oxide are preferred as the polyalkylene oxides.

In the case of the monomer having a hydrophilic group or the hydrophilic polymer component, β preferably has an acidic functional group (may be simply referred to as "acidic group" hereinafter). The acidic group suppresses the thermal deterioration of an aromatic polycarbonate resin preferred in the present invention at the time of melt processing. This is considered to be because the acidic group has an excellent effect of reducing the spcing between layers by an electric function.

An acidic group having no nitrogen atom is particularly preferred. A functional group containing a nitrogen atom such as an amido group or imido group may not suppress the thermal deterioration of an aromatic polycarbonate resin completely at the time of melt processing. This is considered to be because the nitrogen atom is locally basic and causes the thermal decomposition of a carbonate bond.

Examples of the acidic group include carboxyl group, carboxylic anhydride group, sulfonic acid group, sulfinic acid group, phosphonic acid group and phosphinic acid group.

The amount of β in the component C of the present invention is 60 to 10,000 equivalents, preferably 70 to 8,000 equivalents, more preferably 80 to 6,000 equivalents, particularly preferably 100 to 3,000 equivalents per functional group in terms of molecular weight when β is a monomer having a hydrophilic group. The amount of β in the component C is 5 to 95 wt %, preferably 10 to 90 wt %, more preferably 30 to 70 wt %, particularly preferably 30 to 50 wt % based on 100 parts by weight of the component C when β is a hydrophilic polymer segment.

To produce the compound (component C) having the component (α) having affinity for the noncrystalline thermoplastic resin and the hydrophilic component (β), a method for copolymerizing the monomer β with a monomer constituting α, a method for block or graft copolymerizing the polymer component β with α or a method for directly addition reacting β with α is used.

The component C of the present invention is preferably "a polymer having affinity for an aromatic polycarbonate and an acidic functional group", "a polymer having affinity for an aromatic polycarbonate and a polyalkylene oxide segment", "a polymer having affinity for an aromatic polycarbonate and an oxazoline group" or "a polymer having affinity for an aromatic polycarbonate and a hydroxyl group". The above preferred polymers as the component C have a weight average molecular weight of preferably 10,000 to 1,000,000, more preferably 50,000 to 500,000. The weight average molecular weight is calculated as a value in terms of polystyrene measured by GPC using the calibration straight line of a standard polystyrene resin.

Out of these, the polymer having affinity for an aromatic polycarbonate and an acidic functional group is preferred, and the polymer having affinity for an aromatic polycarbonate and a functional group consisting of a carboxyl group and/or a derivative therefrom is more preferred. From the viewpoint of the effect of keeping the heat resistance of an aromatic polycarbonate, the polymer is preferably a polymer having an aromatic ring component in the main chain and a styrene component in the main chain. A styrene-containing polymer (component C-1) having a functional group consisting of a carboxyl group and/or a derivative therefrom is particularly preferred as the component C of the present invention.

The amount of the component C of the present invention is preferably 0.1 to 50 parts by weight, more preferably 0.5 to 20 parts by weight, particularly preferably 1 to 12 parts by weight based on 100 parts by weight of the component A. When the amount of the component C is smaller than 0.1 part by weight, the effect of dispersing the layered silicate becomes unsatisfactory and also the effect of suppressing the thermal deterioration of an aromatic polycarbonate may become unsatisfactory. When the amount is larger than 50 parts by weight, impact resistance and heat resistance may lower.

A description is subsequently given of the styrene-containing polymer (component C-1) having a functional group consisting of a carboxyl group and/or a derivative therefrom particularly preferred as the component C of the present invention. The amount of the functional group consisting of a carboxyl group and/or a derivative therefrom is preferably 0.1 to 12 milliequivalents/g, more preferably 0.5 to 5 milliequivalents/g. One equivalent of the component C-1 means the existence of 1 mol of the carboxyl group. This value can be calculated by back titration with potassium hydroxide.

Examples of the functional group comprising a derivative of a carboxyl group include (i) metal salts obtained by substituting the hydroxyl group of the carboxyl group by a metal ion (including chelate salts), (ii) acid salts obtained by substituting the hydroxyl group of the carboxyl group by a chlorine atom, (iii) esters obtained by substituting the hydroxyl group of the carboxyl group by —OR (R is a monovalent hydrocarbon group), (iv) acid anhydrides obtained by substituting the hydroxyl group of the carboxyl group by —O(CO)R (R is a monovalent hydrocarbon group), (v) amides obtained by substituting the hydroxyl group of the carboxyl group by —NR$_2$ (R is a hydrogen atom or monovalent hydrocarbon group) and (vi) imides obtained by substituting the hydroxyl groups of two carboxyl groups by =NR (R is a hydrogen atom or monovalent hydrocarbon group).

To produce the styrene-containing polymer having a functional group consisting of a carboxyl group and/or a derivative therefrom (to be simply referred to as "carboxyl group(s)" hereinafter), conventional known methods may be used. The methods include (a) one in which a monomer having a carboxyl group and a styrene-containing monomer are copolymerized and (b) one in which a styrene-containing polymer is bonded to or copolymerized with a compound or monomer having a carboxyl group(s).

In the copolymerization of the above method (a), a copolymer such as an alternating copolymer, block copolymer or tapered copolymer may be used in addition to the random copolymer. The copolymerization may be anion living polymerization or group transfer polymerization besides radical polymerization such as solution polymerization, suspension polymerization or bulk polymerization. Further, a method in which polymerization is carried out after the formation of a macromonomer may also be used.

In the above method (b), a radical generating agent such as peroxide or 2,3-dimethyl-2,3-diphenylbutane(dicumyl) is added to a styrene-containing polymer or copolymer as required to carry out a reaction or copolymerization at a high temperature. In this method, a reactive site is thermally created in the styrene-containing polymer or copolymer so that a compound or monomer which is reactive to that active site is reacted. As another method for creating an active site required for a reaction, there is exposure to radiation or an electron beam or giving external force by mechanochemical means. Further, a monomer which creates an active site required for a reaction may be copolymerized with a styrene-containing copolymer in advance. The active site for a reaction may be an unsaturated bond, a peroxide bond or nitrooxide radical which is thermally stable because of high steric hindrance.

Examples of the above compound or monomer having a carboxyl group(s) include unsaturated monocarboxylic acids and derivatives thereof such as acrylic acid, methacrylic acid, acrylamide and methacrylamide, maleic anhydride and derivatives thereof such as citraconic anhydride, N-phenylmaleimide and N-methylmaleimide, glutarimide structure and chelate structure formed by acrylic acid and a polyvalent metal ion. Out of these, monomers having a functional group containing no metal ion or nitrogen atom are preferred, and monomers having a carboxyl group and carboxylic anhydride group are more preferred. Out of these, maleic anhydride is particularly preferred.

Examples of the styrene-based compound include styrene, α-methylstyrene, o-methylstyrene, m-methylstyrene, p-methylstyrene, tert-butylstyrene, α-methylvinyltoluene, dimethylstyrene, chlorostyrene, dichlorostyrene, bromostyrene, dibromostyrene and vinylnaphthalene. Styrene is particularly preferred.

Further, a compound copolymerizable with these compounds, such as acrylonitrile or methacrylonitrile may be used as a comonomer.

Out of the above styrene-containing polymers having a carboxyl group(s), a styrene-containing copolymer obtained by copolymerizing a monomer having a functional group consisting of a carboxyl group and/or a derivative therefrom is preferred in the present invention. This is because a relatively large number of carboxyl groups can be contained in the styrene-containing polymer stably. A styrene-containing copolymer obtained by copolymerizing a monomer having a carboxyl group(s) with a styrene-containing monomer is more preferred. A styrene-maleic anhydride copolymer is particularly preferred. The styrene-maleic anhydride copolymer disperses the organo-modified layered silicate (component B) finely and well because it has high compatibility with both of the ion component contained in the layered silicate and the aromatic polycarbonate resin. Further, it effectively reduces the spacing between layers of the layered silicate, particularly the organo-modified layered silicate by the function of a carboxylic anhydride group with the result that excellent heat stability is provided to the resin composition. Since the copolymer itself has excellent heat stability, the resin composition has high stability at a high temperature required for the melt processing of the aromatic polycarbonate resin.

The composition of the above styrene-containing copolymer comprising a monomer having a carboxyl group(s) is not particularly limited as far as it satisfies the condition for the amount of β. However, a styrene-containing copolymer which comprises 1 to 30 wt % of a monomer having a carboxylic group(s), 99 to 70 wt % of a styrene-containing compound and 0 to 29 wt % of another copolymerizable compound is preferred, and a styrene-containing copolymer comprising 1 to 30 wt % of a monomer having a carboxyl group(s) and 99 to 70 wt % of a styrene-containing compound is particularly preferred.

The molecular weight of the above component C-1 which is a preferred example of the component C of the present invention is not particularly limited. The weight average molecular weight of the component C-1 is preferably in the range of 10,000 to 1,000,000, more preferably 50,000 to 500,000. The weight average molecular weight is calculated in terms of polystyrene by GPC measurement using the calibration straight line of a standard polystyrene resin.

A description is subsequently given of a polymer having a polyalkylene oxide segment, particularly preferably a polyether ester copolymer (component C-2) as another preferred example of the component C of the present invention.

The polyether ester copolymer is a polymer produced by polycondensing a dicarboxylic acid, alkylene glycol and poly(alkylene oxide)glycol or derivatives thereof. The copolymer is particularly preferably a copolymer produced from a poly(alkylene oxide)glycol having a polyalkylene oxide unit represented by the following formula (I) or a derivative thereof (component C-2-1), an alkylene glycol containing 65 mol % or more of tetramethylene glycol or a derivative thereof (component C-2-2) and a dicarboxylic acid containing 60 mol % or more of terephthalic acid or a derivative thereof (component C-2-3):

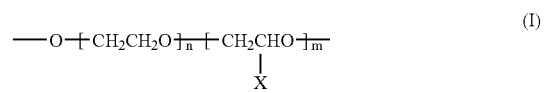

wherein X is a monovalent organic group, and n and m are each an integer of 0 or more, with the proviso that 10≦(n+m)≦120 and when m is 2 or more, X's may be the same or different.

In the above formula (I), X is preferably at least one substituent selected from —CH$_3$, —CH$_2$Cl, —CH$_2$Br, —CH$_2$I and —CH$_2$OCH$_3$. When X is other than the above substituents, steric hindrance becomes large by the substituent, thereby making it difficult to raise the polymerization degree of the copolymer. When (n+m) is smaller than 10, the layered silicate may not be dispersed completely and when (n+m) is larger than 120, it is difficult to obtain a polyether ester copolymer having a high degree of polymerization, and the compatibilizing function of the component C-2 may lower.

The polyalkylene oxide component in the above formula (I) may be selected from a random copolymer, tapered copolymer and block copolymer of a polyethylene oxide component and a component having a substituent X. The polyalkylene oxide in the above formula (I) is preferably a polymer component in which m=0, that is, consisting of only a polyethylene oxide component.

The amount of the component C-2-1 is preferably 30 to 80 wt %, more preferably 40 to 70 wt % based on the total of all the glycol components. When the amount of the component C-2-1 is smaller than 30 wt %, the layered silicate is not dispersed completely, whereby the mechanical properties may lower or the appearance may deteriorate. When the amount of the component C-2-1 is larger than 80 wt %, the layered silicate is not dispersed completely and the strength of the polyether ester copolymer itself lowers, whereby the mechanical properties may lower or the appearance may deteriorate.

The component C-2-2 of the polyether ester copolymer as the component C-2 may comprise a diol other than tetramethylene glycol. Examples of the diol include ethylene glycol, trimethylene glycol, 1,5-pentanediol, 1,6-hexanediol, diethylene glycol, 1,4-cyclohexanediol and 1,4-cyclohexanedimethanol. The content of tetramethylene glycol in the component C-2-2 is 65 mol % or more, preferably 75 mol % or more, more preferably 85 mol % or more. A polyether ester copolymer containing less than 65 mol % of tetramethylene glycol reduces the moldability of the resin composition.

As the dicarboxylic acid or derivative thereof (component C-2-3) of the polyether ester copolymer, a dicarboxylic acid other than terephthalic acid (including what has 2 or more carboxyl groups) may be used. Examples of the dicarboxylic acid include isophthalic acid, phthalic acid, adipic acid, sebacic acid, azelaic acid, dodecanedioic acid, trimellitic acid, pyromellitic acid, naphthalenedicarboxylic acid and cyclohexanedicarboxylic acid. A polyether ester copolymer comprising isophthalic acid is particularly preferred as the component C-2. The content of terephthalic acid in the component C-2-3 is 60 mol % or more, preferably 70 mol % or more, more preferably 75 to 95 mol %. A polyether ester copolymer containing less than 60 mol % of terephthalic acid is not preferred because the polymerization degree of the copolymer tends to lower and it is difficult to produce a polyether ester copolymer having a sufficiently high degree of polymerization.

The component A, component B and component C used in the resin compositions-I, -II and -III of the present invention have been described above. A description is subsequently given of the objects and features of the resin compositions-I, -II and -III of the present invention.

The resin composition-I comprises 100 parts by weight of (A) a noncrystalline thermoplastic resin as the component A and 0.1 to 50 parts by weight of (B) a layered silicate which satisfies the following (i) to (iii) as the component B.
(i) The layered silicate has a cation exchange capacity of 50 to 200 milliequivalents/100 g and at least 40% of the cation exchange capacity is substituted by an organic onium ion.
(ii) 60% or more of the layered silicate particles have a thickness of 100 nm or less in the resin composition.
(iii) The interlayer spacing of the layered silicate (component B) in the resin composition is smaller than the interlayer spacing of the layered silicate alone by 0.5 nm or more.

The resin component (component A) of the resin composition-I may be either an aromatic polycarbonate resin or another noncrystalline thermoplastic resin, and the component B is a layered silicate which satisfies all the above requirements (i) to (iii). It is not essential but preferred that the resin composition should comprise the component C. Therefore, the amount of the component C is 0 to 50 parts by weight, preferably 0.1 to 50 parts by weight based on 100 parts by weight of the component A.

The resin composition-II comprises (A) a resin containing at least 50 wt % of an aromatic polycarbonate resin as the component A, (B) a layered silicate which satisfies the following (i) and (ii) as the component B, and (C) a compound having affinity for the aromatic polycarbonate resin and a hydrophilic component as the component C. This resin composition-II comprises 100 parts by weight of the component A, 0.1 to 50 parts by weight of the component B and 0.1 to 50 parts by weight of the component C.
(i) The layered silicate has a cation exchange capacity of 50 to 200 milliequivalents/100 g.
(ii) 60% or more of the layered silicate particles have a thickness of 100 nm or less in the resin composition.

The resin composition-III comprises (A) 100 parts by weight of a resin containing at least 50 wt % of an aromatic polycarbonate resin as the component A and (B) 0.1 to 50 parts by weight of a layered silicate which satisfies all the following requirements (i) to (iii) as the component B.
(i) The layered silicate has a cation exchange capacity of 50 to 200 milliequivalents/100 g and at least 40% of the cation exchange capacity is substituted by an organic onium ion.
(ii) 60% or more of the layered silicate particles have a thickness of 100 nm or less in the resin composition.
(iii) The interlayer spacing of the layered silicate (component B) in the resin composition is smaller than the interlayer spacing of the layered silicate alone by 0.5 nm or more.

It is not essential but preferred that the resin composition-III should comprise the component C. Therefore, the amount of the component C is 0 to 50 parts by weight, preferably 0.1 to 50 parts by weight based on 100 parts by weight of the component A.

In the above resin compositions-II and -III, the content of the aromatic polycarbonate resin in the resin component (component A) is 50 wt % or more, preferably 60 to 100 wt %, particularly preferably 70 to 100 wt %. When the component A is a mixture of an aromatic polycarbonate resin and another resin, the another resin is not particularly limited and may be a resin which is generally mixed with an aromatic polycarbonate resin. The another resin is preferably and typically a styrene-containing resin or aromatic polyester resin. The content of the another resin in the component A is 0 to 50 wt %, preferably 0 to 40 wt %. When another resin is contained, its amount is 1 to 50 wt %, preferably 2 to 40 wt %. Examples of the styrene-containing resin and aromatic polyester resin which are given below do not include compounds which may be used as the component C.

The styrene-containing resin as the another resin in the component A of the resin compositions-I and -II of the present invention is obtained by polymerizing a styrene-containing monomer and optionally at least one selected from another vinyl monomer and a rubber-like polymer copolymerizable with the styrene-containing monomer.

Examples of the styrene-containing monomer used in the above styrene-containing resin component include styrene and styrene derivatives such as α-methylstyrene, o-methylstyrene, p-methylstyrene, vinylxylene, ethylstyrene, dimethylstyrene, p-tert-butylstyrene, vinylnaphthalene, methoxystyrene, monobromostyrene, dibromostyrene, fluorostyrene and tribromostyrene. Styrene is particularly preferred. They may be used alone or in combination of two or more.

Examples of the another vinyl monomer copolymerizable with the styrene-containing monomer include vinyl cyanide compounds such as acrylonitrile and methacrylonitrile; aryl esters of acrylic acid such as phenyl acrylate and benzyl acrylate; alkyl esters of acrylic acid such as methyl acrylate, ethyl acrylate, propyl acrylate, butyl acrylate, amyl acrylate, hexyl acrylate, 2-ethylhexyl acrylate, octyl acrylate, cyclohexyl acrylate and dodecyl acrylate; aryl esters of methacrylic acid such as phenyl methacrylate and benzyl methacrylate; alkyl esters of methacrylic acid such as methyl methacrylate, ethyl methacrylate, propyl methacrylate, butyl methacrylate, amyl methacrylate, hexyl methacrylate, 2-ethylhexyl methacrylate, octyl methacrylate, cyclohexyl methacrylate and dodecyl methacrylate; methacrylic acid esters having an epoxy group such as glycidyl methacrylate; maleimide-based monomers such as maleimide, N-methylmaleimide and N-phenylmaleimide; and α,β-unsaturated carboxylic acids and anhydrides thereof such as acrylic acid, methacrylic acid, maleic acid, maleic anhydride, phthalic acid and itaconic acid.

Examples of the above rubber-like polymer copolymerizable with the styrene-containing monomer include diene-based copolymers such as polybutadiene, polyisoprene, styrene.butadiene random copolymer and block copolymer, acrylonitrile.butadiene copolymer, copolymer of an acrylic acid alkyl ester or methacrylic acid alkyl ester and butadiene, and butadiene.isoprene copolymer, ethylene.propylene random copolymer and block copolymer, copolymers of ethylene and an α-olefin such as ethylene.butene random copolymer and block copolymer, copolymers of ethylene and an unsaturated carboxylic acid ester such as ethylene.methacrylate copolymer and ethylene.butyl acrylate copolymer, copolymers of ethylene and an aliphatic vinyl such as ethylene.vinyl acetate copolymer, nonconjugated diene terpolymers of ethylene, propylene and nonconjugated diene such as ethylene.propylene.hexadiene terpolymer, acrylic rubber such as butyl polyacrylate, and composite rubber having a structure that a polyorganosiloxane rubber component and a polyalkyl (meth) acrylate rubber component are entangled with each other so that they cannot be separated from each other (to be referred to as "IPN rubber" hereinafter).

Examples of the styrene-containing resin include polystyrene, styrene.butadiene.styrene copolymer (SBS), hydrogenated styrene.butadiene.styrene copolymer (hydrogenated SBS), hydrogenated styrene.isoprene.styrene copolymer (SEPS), high-impact polystyrene (HIPS), acrylonitrile.styrene copolymer (AS resin), acrylonitrile.butadiene.styrene copolymer (ABS resin), methyl methacrylate.butadiene.styrene copolymer (MBS resin), methyl methacrylate.acrylonitrile butadiene.styrene copolymer (MABS resin), acrylonitrile.acrylic rubber-styrene copolymer (AAS resin) and acrylonitrile.ethylene propylene-based rubber-styrene copolymer (AES resin), styrene.IPN rubber copolymer, and mixtures thereof. The styrene-containing resin may have high stereoregularity like syndiotactic polystyrene owing to use of a catalyst such as metallocene catalyst at the time of production. Further, a polymer and copolymer having a narrow molecular weight distribution, a block copolymer, and a polymer and copolymer having high stereoregularity obtained by anion living polymerization and radical living polymerization may also be used according to circumstances. Out of these, polystyrene (PS), high-impact polystyrene (HIPS), acrylonitrile.styrene copolymer (AS resin), methyl methacrylate.butadiene.styrene copolymer (MBS resin) and acrylonitrile.butadiene.styrene copolymer (ABS resin) are preferred, and ABS resin is the most preferred. A mixture of two or more styrene-containing resins may also be used.

The ABS resin is a mixture of a thermoplastic graft copolymer obtained by graft polymerizing a vinyl cyanide compound and an aromatic vinyl compound with a diene-based rubber component and a copolymer of a vinyl cyanide compound and an aromatic vinyl compound. The diene-based rubber component forming this ABS resin is a rubber having a glass transition point of 10° C. or less, such as polybutadiene, polyisoprene or styrene.butadiene copolymer and used in an amount of preferably 5 to 80 wt %, particularly preferably 10 to 50 wt % based on 100 wt % of the ABS resin component. Examples of the vinyl cyanide compound to be graft polymerized with the diene-based rubber component are those enumerated above, out of which acrylonitrile is particularly preferred. Examples of the aromatic vinyl compound to be graft polymerized with the diene-based rubber component are those enumerated above, out of which styrene and α-methylstyrene are particularly preferred. The total amount of the components to be graft polymerized with the diene-based rubber component is preferably 95 to 20 wt %, particularly preferably 50 to 90 wt % based on 100 wt % of the ABS resin component. Preferably, the amount of the vinyl cyanide compound is 5 to 50 wt % and the amount of the aromatic vinyl compound is 95 to 50 wt % based on 100 wt % of the total of the vinyl cyanide compound and the aromatic vinyl compound. Methyl (meth)acrylate, ethyl acrylate, maleic anhydride or N-substituted maleimide may be used as one of the components to be graft polymerized with the diene-based rubber component. The amount of the above substance is preferably 15 wt % or less based on the ABS resin component. A conventionally known initiator, chain transfer agent, emulsifier and the like used for a reaction may be further used as required.

The weight average particle diameter of the rubber particles contained in the ABS resin is preferably 0.1 to 5.0 μm, more preferably 0.15 to 1.5 μm, particularly preferably 0.2 to 1 μm. A rubber having a particle size distribution with a single peak, or two or more peaks may be used, and a rubber having such morphology that rubber particles form a single phase or that a salami structure is formed by containing an occluded phase around each rubber particle may also be used.

It has been well known that ABS resin contains a vinyl cyanide compound and an aromatic vinyl compound which are not graft polymerized with a diene-based rubber component, and the ABS resin of the present invention may contain a free polymer component formed by polymerization. The molecular weight of a free copolymer of a vinyl cyanide compound and an aromatic vinyl compound is preferably 0.2 to 1.0, more preferably 0.25 to 0.5 in terms of reduced viscosity (dl/g).

The total amount (graft ratio) of the graft polymerized vinyl cyanide compound and aromatic vinyl compound is preferably 20 to 200 wt %, more preferably 20 to 70 wt % based on the diene-based rubber component.

This ABS resin may be produced by bulk polymerization, suspension polymerization or emulsion polymerization, or by single-stage or multi-stage copolymerization. A blend of the ABS resin obtained by the above production method and a vinyl compound polymer obtained by copolymerizing an aromatic vinyl compound with a vinyl cyanide component separately may also be preferably used.

The aromatic polyester resin as the another resin which can be used as a resin component (component A) in the resin compositions-I and -II of the present invention is a polymer or copolymer which comprises an aromatic dicarboxylic acid or a reactive derivative thereof and a diol or an ester derivative thereof as the main ingredients and is obtained by a condensation reaction.

Preferred examples of the aromatic dicarboxylic acid include terephthalic acid, isophthalic acid, orthophthalic acid, 1,5-naphthalenedicarboxylic acid, 2,6-naphthalenedicarboxylic acid, 4,4'-biphenyldicarboxylic acid, 4,4'-biphenylether dicarboxylic acid, 4,4'-biphenylmethanedicarboxylic acid, 4,4'-biphenylsulfonedicarboxylic acid, 4,4°-biphenylisopropylidenedicarboxylic acid, 1,2-bis(phenoxy)ethane-4,4'-dicarboxylic acid, 2,5-anthracenedicarboxylic acid, 2,6-anthracenedicarboxylic acid, 4,4'-p-terphenylenedicarboxylic acid and 2,5-pyridinedicarboxylic acid. Out of these, terephthalic acid and 2,6-naphthalenedicarboxylic acid are particularly preferred.

These aromatic dicarboxylic acids may be used in combination of two or more. The dicarboxylic acid may be mixed with at least one selected from aliphatic dicarboxylic acids such as adipic acid, azelaic acid, sebacic acid and dodecanedioic acid, and alicyclic dicarboxylic acids such as cyclohexanedicarboxylic acid if small in quantity.

Examples of the diol as a component of the aromatic polyester of the present invention include aliphatic diols such as ethylene glycol, propylene glycol, butylene glycol, hexylene glycol, neopentyl glycol, pentamethylene glycol, hexamethylene glycol, decamethylene glycol, 2-methyl-1,3-propanediol, diethylene glycol and triethylene glycol; alicyclic diols such as 1,4-cyclohexanedimethanol; diols containing an aromatic ring such as 2,2-bis(β-hydroxyethoxyphenyl)propane; and mixtures thereof. At least one long-chain diol having a molecular weight of 400 to 6,000 such as polyethylene glycol, poly-1,3-propylene glycol or polytetramethylene glycol may be copolymerized if small in quantity.

The aromatic polyester of the present invention may be branched by introducing a small amount of a branching agent. The branching agent is not limited to a particular type but selected from trimesic acid, trimellitic acid, trimethylol ethane, trimethylol propane and pentaerythritol.

Preferred examples of the aromatic polyester resin include polyethylene terephthalate (PET), polypropylene terephthalate, polybutylene terephthalate (PBT), polyhexylene terephthalate, polyethylene naphthalate (PEN), polybutylene naphthalate (PBN), polyethylene-1,2-bis(phenoxy)ethane-4,4'-dicarboxylate, copolyesters such as polyethylene isophthalate/terephthalate and polybutylene terephthalate/isophthalate, and mixtures thereof. Out of these, polyethylene terephthalate and polyethylene naphthalate comprising ethylene glycol as a diol component are preferred, what comprise 50 wt % or more of polyethylene terephthalate or polyethylene naphthalate based on 100 wt % of the aromatic polyester resin are more preferred, and what comprise 50 wt % or more of polyethylene terephthalate are particularly preferred when excellent thermal properties and mechanical properties are required. Polybutylene terephthalate and polybutylene naphthalate comprising butylene glycol as a diol component are preferred, and what comprise polybutylene terephthalate/polyethylene terephthalate in a weight ratio of 2 to 10 are more preferred when good balance between moldability and mechanical properties is required.

The terminal group structure of the obtained aromatic polyester resin is not particularly limited. The amount of the terminal hydroxyl group may be the same, larger or smaller than the amount of the terminal carboxyl group. These terminal groups may be capped by reacting a compound having reactivity with these terminal groups.

As for the method of producing the aromatic polyester resin, the aromatic polyester resin is produced by polymerizing the above dicarboxylic acid component and diol component under heating in the presence of a polycondensation catalyst containing titanium, germanium or antimony and removing the formed water, lower alcohol or diol to the outside of the reaction system in accordance with a commonly used method. The germanium-containing polymerization catalyst is, for example, an oxide, hydroxide, halide, alcoholate or phenolate of germanium, as exemplified by germanium oxide, germanium hydroxide, germanium tetrachloride and tetramethoxy germanium.

A conventionally known manganese, zinc, calcium or magnesium compound which is used in an ester exchange reaction before polycondensation may be used in combination with the above catalyst in the method, and polycondensation can be carried out by deactivating the above catalyst with a phosphoric acid or phosphorous acid compound after the end of the ester exchange reaction.

The molecular weight of the aromatic polyester resin is not particularly limited but its intrinsic viscosity measured in an o-chlorophenol solvent at 35° C. is 0.4 to 1.2, preferably 0.6 to 1.15.

The resin composition of the present invention may contain a reinforcing filler other than the component B in limits that do not impair the object of the present invention. As the reinforcing filler may be used generally known fillers such as glass fiber, carbon fiber, glass flake, wollastonite, kaolin clay, mica, talc and whiskers (potassium titanate whisker, aluminum borate whisker, etc.). The shape of the reinforcing filler may be freely selected from fibrous, flaky, spherical and hollow shapes. Glass fiber, carbon fiber and glass flake are preferred for the improvement of the strength and impact resistance of the resin composition. To make effective use of the extremely excellent surface appearance (surface smoothness) of the resin composition of the present invention, the size of the reinforcing filler is preferably very small. The fiber diameter of a fibrous filler or the size of a flaky filler or particulate filler is preferably 5 μm or less, more preferably 4 μm or less, particularly preferably 3 μm or less. The lower limit is suitably 0.05 μm. Examples of the fine reinforcing filler include talc, wollastonite, kaolin clay and whiskers. The amount of the reinforcing filler is suitably 50 wt % or less, preferably 0.5 to 50 wt %, more preferably 1 to 35 wt % based on 100 wt % of the entire resin composition. When the amount is larger than 50 wt %, moldability deteriorates and the effect of the present invention is not obtained disadvantageously.

Another crystalline thermoplastic resin which is not enumerated above (crystalline thermoplastic resin such as polyamide resin, polyacetal resin, polyolefin resin or polyphenylene sulfide resin), flame retardant (such as brominated epoxy resin, brominated polystyrene, brominated polycarbonate, brominated polyacrylate, monophosphate compound, phosphate oligomer compound, phosphonate oligomer compound, phosphonirile oligomer compound, phosphonic acid amide compound, organic sulfonic acid alkali (earth) metal salt or silicone-based flame retardant), flame retardant aid (such as sodium antimonite or antimony trioxide), anti dripping inhibitor (such as polytetrafluoroethylene having fibril forming ability), nucleating agent (such as sodium stearate or ethylene-sodium acrylate), antioxidant (such as hindered phenolic compound or sulfur-based antioxidant), impact modifier, ultraviolet light absorber, optical stabilizer, release agent, lubricant, colorant (such as dye or inorganic pigment), light diffusing agent, antistatic agent, fluidity modifier, inorganic or organic anti-fungus agent, optical catalyst-based stain-proofing agent (such as titanium oxide fine particles or zinc oxide fine particles), infrared light absorber, photochromic agent and fluorescent brightener may be blended in limits that do not impair the object of the present invention. These additives may be used in amounts which are known when they are blended with an aromatic polycarbonate resin.

The resin composition of the present invention is also excellent in light transmission. Therefore, a light diffusion function obtained by blending a light diffusing agent, a high reflection function obtained by blending a white pigment and a design effect obtained by blending a special dye such as a fluorescent dye or luminous pigment are exhibited more effectively. Examples of the light diffusing agent include polymer fine particles such as acrylic crosslinked particles, silicone crosslinked particles, and inorganic fine particle such as glass powder, extremely thin glass flake and calcium carbonate particles. Examples of the white pigment include titanium oxide, zinc oxide and zinc sulfide. Out of these, titanium oxide is preferred. Further, titanium oxide whose surface is treated with an organic surface treating agent such as a silicone compound typified by polyalkyl hydrogen siloxane is more preferred. Examples of the fluorescent dye include fluorescent dyes such as anthraquinone-based dyes, perylene-based dyes, coumarin-based dyes, thioindigo-based dyes and thioxanthone-based dyes, and fluorescent brighteners such as bisbenzoxazolyl-stilbene derivatives, bisbenzoxazolyl-naphthalene derivatives, bisbenzoxazolyl-thiophene derivatives and coumarin derivatives. The above additives may be used in amounts which are known when they are blended with an aromatic polycarbonate resin.

The resin composition of the present invention preferably contains a phosphorus-containing heat stabilizer. The phosphorus-containing heat stabilizer is preferably a compound which is widely known as a phosphorus-containing heat stabilizer for an aromatic polycarbonate resin. Examples of the compound include phosphoric acid esters such as trimethyl phosphate, phosphorous acid esters such as triphenyl phosphate, trisnonylphenyl phosphite, distearyl pentaerythritol diphosphite, bis(2,6-di-tert-butyl-4-methylphenyl)pentaerythritol diphosphite, tris(2,4-di-tert-butylphenyl)phosphite, 2,2-methylenebis(4,6-di-tert-butylphenyl)octyl phosphate and bis(2,4-di-tert-butylphenyl)pentaerythritol diphosphite, and phosphonous acid esters such as tetrakis (2,4-di-tert-butylphenyl)-4,4'-biphenylene diphosphonite. The phosphorus-containing heat stabilizer is contained in an amount of 0.001 to 1 wt %, more preferably 0.01 to 0.5 wt %, much more preferably 0.01 to 0.2 wt % based on 100 wt % of the entire composition. The heat stability is further improved by blending the phosphorus-containing heat stabilizer, thereby making it possible to obtain excellent moldability.

To produce the resin composition of the present invention, any method is employed. For example, the above components and optionally other components are pre-mixed and melt kneaded together, and then pelletized. The pre-mixing means is a Nauta mixer, V-shaped blender, Henschel mixer, mechanochemical device, extrusion mixer or the like. Granulation in the pre-mixing step may be carried out optionally with an extrusion granulator or briquetting machine. After pre-mixing, a melt kneader, typically a vented twin-screw extruder is used to melt knead the above components and a pelletizer is used to pelletize the obtained product. A Banbury mixer, kneading roll or thermostatic agitator may also be used as the melt kneader. A multi-screw extruder, typically a vented twin-screw extruder is preferred. By using the multi-screw extruder, the organo-modified layered silicate is finely dispersed in the base resin with strong shearing force. This dispersion is carried out in the presence of the effect of reducing the spacing between layers, thereby suppressing the exposure of ions between layers to the outside. As a result, excellent dispersion and high heat stability can be obtained at the same time.

Melt kneading by a melt kneader is preferably carried out as follows for the production of the resin composition of the present invention. That is, the layered silicate (component B) having a cation exchange capacity of 50 to 200 milliequivalents/100 g and the compound (component C) having affinity for the noncrystalline thermoplastic resin as the component A and a hydrophilic component, particularly preferably a styrene-containing polymer (component C-1) having a functional group consisting of a carboxyl group and/or a derivative therefrom are melt kneaded together in advance. Thereafter, the melt kneaded product and the noncrystalline thermoplastic resin, particularly preferably an aromatic polycarbonate as the component A are melt kneaded together by a multi-screw extruder. This melt kneading method is preferred because the heat stability of the noncrystalline thermoplastic resin is improved. It is also preferred because a reduction in the molecular weight of the aromatic polycarbonate resin is suppressed. It is considered that the component C acts on the component B to the full by melt kneading the components B and C to obtain a predetermined effect efficiently.

According to the present invention, it has been found that a composition obtained by melt kneading the component B and C is valuable itself as an additive for a resin, particularly an aromatic polycarbonate resin.

Thus, according to the present invention, there is provided a resin additive for reinforcing the physical properties of a resin, which comprises (C) 100 parts by weight of a compound (component C) having affinity for a resin to be blended and a hydrophilic component and (B) 1 to 100 parts by weight of a layered silicate (component B) having a cation exchange capacity of 50 to 200 milliequivalents/100 g at least 40% of which is exchanged with an organic onium ion.

The component C in this resin additive is preferably a styrene-maleic anhydride copolymer. This resin additive is advantageously blended with an aromatic polycarbonate resin or a resin containing 50 wt % or more of an aromatic polycarbonate resin.

More specifically, the advantageous method of producing the resin composition of the present invention is (i) a method in which the components B and C are melt kneaded together by a vented twin-screw extruder and pelletized, and the obtained pellet is melt kneaded with the component A, or (ii) a method in which the components B and C are supplied from the main feed port of a vented twin-screw extruder and part or all of the component A is added from a supply port at an intermediate portion of the twin-screw extruder to the components B and C which have already been melt kneaded together. In these methods in which the components B and C are melt kneaded together in advance, part of the component A may be added at the time of melt kneading.

Various products can be manufactured by injection molding a pellet produced from the resin composition of the present invention as described above. Moldings can be obtained by not only an ordinary molding technique but also injection compression molding, injection press molding, gas assist injection molding, insert molding, in-mold coating molding, insulated metal molding, quick heating/cooling metal molding, two-color molding, sandwich molding and ultra high speed injection molding according to purpose. The advantages of these molding techniques are already widely known. Both cold runner molding and hot runner molding can be employed.

The resin composition of the present invention may be used in the form of a profiled extrusion molded article, sheet or film by extrusion molding. To mold a sheet or film, inflation, calendering or casting may also be used. Further, the resin composition of the present invention can be molded into a thermally shrinkable tube by a specific stretching operation. A hollow molded article can be obtained by rotation molding or blow molding the thermoplastic resin composition of the present invention.

The inventors of the present invention have found through researches that the above resin composition of the present invention has extremely unique melt viscosity characteristics and accordingly is extremely suitable for extrusion molding, blow molding or injection molding for the production of thin molded articles.

That is, according to the present invention, there are provided the resin composition of the present invention whose complex viscosity ratio (log[ηa/ηb]) satisfies the following expression (1) and also a method of producing a molded article by melt extrusion molding or melt blow molding a resin composition having the above melt viscosity characteristics:

$$\log[\eta a/\eta b] \geq 0.5 \tag{1}$$

wherein ηa and ηb are complex viscosity coefficients (Pa·s) measured by a parallel disk type rotary rheometer at 240° C. and angular frequencies of 1 rad/s and $10^2$ rad/s, respectively.

According to the present invention, there is provided a method of producing a thin molded article by melt injection molding a resin composition which satisfies the complex viscosity ratio of the above expression (1).

The resin composition of the present invention which has the above melt viscosity characteristics has much higher viscosity in a low shear rate range than viscosity in a high shear rate range. In other words, the resin composition has melt viscosity characteristics having extremely high dependence on shear rate. The following effect is achieved by the above characteristics. That is, the composition has excellent forming properties in extrusion molding or blow molding. The composition has the effect of suppressing drooling, a stringing phenomenon and the generation of a flash while it has high fluidity in injection molding. As a result, the composition is suitable for the injection molding of a thin molded article. All of forming properties in extrusion molding or blow molding and the effect of high fluidity and suppressing drooling, a stringing phenomenon and the generation of a flash in injection molding may be simply referred to as "molding characteristics" hereinafter.

The resin composition of the present invention has improved characteristics of extrusion molding, blow molding and injection molding for a thin molded article as described above.

In the present invention, 0.5 on the right side of the above expression (1) is preferably 0.7, more preferably 0.8.

Further, the upper limit of log[ηa/ηb] on the left side of the above expression (1) is preferably 1.2, more preferably 1.0, much more preferably 0.9. Above the upper limit, the absolute value of ηa relatively lowers and sufficient viscosity may not be maintained in the low shear rate range.

Further, in the above expression (1), the upper limit of ηa (Pa·s) is preferably 15,000, more preferably 12,000, much more preferably 10,000. The lower limit of ηb (Pa·s) is preferably 200, more preferably 400, much more preferably 500. When the upper limit of ηa and the lower limit of ηb fall within the above ranges, the resin composition has excellent molding characteristics.

How to calculate complex viscosity coefficients (ηa and ηb) in the above expression (1) is explained below. That is, data on the dependence on angular frequency of complex viscosity coefficient at various temperatures including 240° C. are obtained using a parallel disk type rotary rheometer. The obtained data at each temperature is calculated based on temperature-frequency conversion rules (time-temperature conversion rules). Data on complex viscosity coefficients at a wide angular frequency range are obtained from the results in order to calculate complex viscosity coefficients at angular frequencies of 1 rad/s and $10^2$ rad/s from the data. The curve calculated based on the above temperature-frequency conversion rules is easily drawn using computer software attached to the rheometer.

The reason for use of the above method is that the detection torque accuracy of the commonly used parallel disk type rotary rheometer does not correspond to a wide torque range. The measurement of complex viscosity coefficient by the parallel disk type rotary rheometer is carried out by inputting a certain distortion in a range where the viscosity coefficient has no dependence on distortion.

Extrusion molding is used to obtain a continuous product by plasticizing raw materials by an extrusion molding machine, kneading them together, extruding the kneaded product from a die to provide a desired sectional form to the extruded product and solidifying it. The shape of the extrusion molded product is not particularly limited, as exemplified by film-like and sheet-like molded products when a T die and a coat hanger die are used, tube-like molded products when a spiral die is used, fibrous molded products, bar-like molded products and various shaped molded products obtained by profiled extrusion molding. Extrusion molding includes the molding of a film-, sheet- or tube-like molded product by an inflation method using a circular die. Extrusion molding can be used to produce a multi-layer molded product from resin compositions different in constitution or from a resin composition and another resin in the present invention.

In general, blow molding includes extrusion blow molding and injection blow molding. Extrusion blow molding is carried out by extruding a resin which is molten by heating with an extruder from a die head into a tube-like form (parison), sandwiching the molten parison between molds to pinch off and fuse the lower portion of the parison, blowing air into the inside of the parison to contact the parison to the inner surfaces of the molds, cooling the resin, and opening the molds to take out the molded product. Since extrusion blow molding is carried out before the melt extruded parison becomes cold, it is also called "direct blow molding". Injection blow molding is carried out by molding a test tube-like bottomed parison (preform) by injection molding and blow molding this parison at a temperature higher than its glass transition temperature.

The resin composition of the present invention is suitable for direct blow molding because it has excellent drawdown characteristics. Therefore, more preferably, according to the present invention, there is provided a thermoplastic resin composition for direct blow molding which (i) is essentially composed of a noncrystalline thermoplastic resin and (ii) has melt viscosity characteristics that its complex viscosity coefficients satisfy the above expression (1).

Blow molding in the present invention can be used to produce a multiple-layered product from resin compositions different in constitution or from a resin composition and another resin. Blow molding includes stretch blow molding and blow molding for the production of a tubular molded product which is bent three dimensionally.

The thin molded product in the present invention is a molded product whose main portion has a thickness of less than 2 mm. The thickness is preferably 0.05 mm or more and less than 2 mm, more preferably 0.1 to 1.5 mm, much more preferably 0.1 to 1 mm. Part of the molded product may have a thickness larger than the above upper limit. The main portion is a portion which accounts for more than 60% of the total area of the molded product.

A so-called super high-speed injection molding technique has been recently used to mold a thin molded product. This molding technique reduces the melt viscosity of a resin, making use of the dependence on shear rate of the resin and heat generated by shearing. As a result, the molding technique improves fluidity at the time of injection molding to enable the molding of a thinner molded product. The thermoplastic resin composition for injection molding a thin molded product of the present invention is suitable for super high-speed injection molding because its dependence on shear rate is extremely high. That is, the melt viscosity of the resin composition of the present invention becomes lower as the shear rate rises, and its fluidity is improved more than an ordinary resin. Sufficient viscosity is ensured in the low shear rate range for the resin composition of the present invention, thereby suppressing a molding failure such as the generation of a flash.

The injection speed of the super high-speed injection molding technique is preferably 300 mm/sec or more, more preferably 350 mm/sec or more. The upper limit is suitably 800 mm/sec.

The resin composition of the present invention has excellent heat stability and a small reduction in the molecular weight of its resin caused by molding. For instance, when the component A is an aromatic polycarbonate resin, a resin composition which has a reduction in viscosity average molecular weight ($\Delta M$) evaluated by a heat stability evaluation method described below of 3,000 or less is preferred. The above $\Delta M$ value is achieved by a resin composition comprising the above components A, B and C, well by a resin composition comprising the above components A, B and C-1 or C-2, extremely well by a resin composition comprising the above components A, B and C-1. By achieving the above heat stability, the resin composition of the present invention can retain sufficient viscosity in the low shear rate range in any molding technique and can improve molding characteristics in any molding technique.

In injection molding, the heat stability evaluation method is to obtain the difference between the viscosity average molecular weight of a molded product obtained under the molding condition of an appropriate range used for the evaluation of ordinary characteristic properties and the production of an ordinary article and the viscosity average molecular weight of a molded product obtained by extending the residence time in a molding machine by 10 minutes while the resin is molten. The molding condition of an appropriate range refers to a temperature at which the length of an Archimedean spiral flow having a thickness of 2 mm and an injection pressure of 120 MPa measured substantially without residence in the molding machine (for example, right after purging) becomes 300 mm. Further, the mold temperature in the above measurement is a temperature 30° C. lower than its deflection temperature under load (ISO 75, load of 1.80 MPa) Since $\Delta M$ becomes larger as the temperature rises, it is not necessary to carry out molding under the above condition of an appropriate range when the appropriateness of $\Delta M$ is to be judged. If the above $\Delta M$ is obtained at a temperature at which the flow length becomes 300 mm or more at a mold temperature 30° C. or more lower than the deflection temperature under load, it can be said that the obtained resin composition is the preferred resin composition of the present invention.

The above $\Delta M$ is preferably 2,500 or less, more preferably 2,000 or less, much more preferably 1,500 or less.

A molded article formed from the resin composition of the present invention has excellent stiffness, a good surface appearance (surface smoothness) and high heat stability. Therefore, the above resin molded article thus obtained is manufactured under wide molding conditions without any problem in practical use and has excellent stiffness and a good surface appearance. More specifically, according to the present invention, there is provided a resin molded article which is formed from the resin composition of the present invention, has an arithmetic mean roughness Ra measured in accordance with JIS B0601 of 0.1 µm or less and a flexural modulus measured in accordance with ASTM D790 1.2 times or more the flexural modulus of a molded product formed from the component A constituting the resin composition. This resin molded article is of higher industrial value. Heretofore, to improve the flexural modulus of a resin molded article, a fibrous reinforcing agent or inorganic filler has been generally used. In this case, the surface roughness of the obtained resin molded article greatly lowers, thereby making it impossible to obtain a resin molded article having the above good balance.

The arithmetic roughness Ra of the resin molded article is preferably 0.08 µm or less, more preferably 0.05 µm or less. The lower limit is suitably about 0.001 µm although it greatly depends on a mold used for molding. The flexural modulus of the resin molded article is preferably 1.3 to 3 times, more preferably 1.4 to 2.8 times the flexural modulus of a molded article formed from the component A constituting the resin composition. When the component A is a polycarbonate resin, the flexural modulus of a molded article is preferably 2,500 MPa or more, more preferably 2,800 MPa or more, much more preferably 3,000 MPa or more. The upper limit is suitably 8,000 MPa, preferably 7,000 MPa, more preferably 6,000 MPa.

Although the resin molded article of the present invention has excellent surface smoothness as described above, a surface modified molded article having excellent smoothness can be obtained by carrying out surface modification, making use of this advantage. The surface modification is intended to form a new layer on the surface of a resin molded article by vapor deposition (physical vapor deposition, chemical vapor deposition, etc.), plating (electroplating, electroless plating, melt plating, etc.), painting, coating or printing. The methods used for an ordinary aromatic polycarbonate resin can be applied. In surface modification carried out by these methods, the surface smoothness of a resin molded article to be modified has a great influence on its surface properties after modification. However, when the resin molded article of the present invention is used, a molded article having excellent surface smoothness can be obtained. In general, surface modification may be carried out not only to provide a surface decoration or function but also to improve the surface smoothness of a resin molded article. Although the thickness of modification must be made large when the surface smoothness is low, the resin molded article of the present invention can be surface modified efficiently even when it is very thin. That is, the effect of the present invention can be obtained advantageously when the thickness of modification article is 50 µm or less. The thickness is preferably 20 µm or less, more preferably 5 µm or less, much more preferably 2 μm or less. The lower limit value is suitably 0.001 μm. Further, when surface modification is carried out to a thickness 500 times or less the arithmetic mean roughness Ra measured in accordance with JIS B0601 of a resin molded article alone without a metal layer or metal oxide layer, use is made of the feature of the resin molded article of the present invention. The thickness is preferably 200 times or less, more preferably 100 times or less, particularly preferably 50 times or less larger than Ra. The preferred surface modification method in the present invention is vapor deposition or plating in which the thickness of modification is small. Particularly preferably, a metal layer or a metal oxide layer is laminated. Part or all of the surface of the molded article can be modified.

The resin composition of the present invention can be used in parts which could not be formed from a resin material, making use of the above feature. Particularly, it can be used in application fields which require extremely high surface smoothness and stiffness that could be attained only by glass molded products or metal precision cut products. The application range of the resin composition can be expanded effectively by coating the surface of its molded product with a metal or metal oxide. The application fields of the molded products include mirrors for use in optical precision devices, polygon mirrors for use in laser copier and printers, and hard disks. That is, according to the present invention, there is provided a metal or metal oxide-coated molded article which is formed from the resin composition of the present invention and has a metal layer or metal oxide layer on the surface.

Further, the resin composition of the present invention is useful in such fields as electronic and electric appliances, OA equipment, auto parts, mechanical parts, agricultural materials, fishing materials, transport containers, packing containers and miscellaneous goods. As the thermoplastic resin composition of the present invention has excellent moldability, it is suitably used to form thin molded articles. The thin injection molded articles include, for example, housing molded articles such as battery housings, lens tubes, memory cards, speaker cones, disk cartridges, plane emitters, mechanical parts for micromachines, nameplates and IC cards.

The method of forming a metal layer or metal oxide layer on the surface of the resin molded article is not particularly limited. It may be vapor deposition, flame spray coating or plating. The vapor deposition may be physical vapor deposition or chemical vapor deposition. Examples of the physical vapor deposition include vacuum deposition, sputtering and ion plating. Examples of the chemical vapor deposition (CVD) include thermal CVD, plasma CVD and optical CVD.

Examples of the flame spray coating include atmospheric pressure plasma flame spray coating and vacuum plasma flame spray coating. Examples of the plating include electroless plating (chemical plating), hot dipping and electroplating. Laser plating may be used as the electroplating.

Out of these, vapor deposition and plating are preferred to form a metal layer on the resin molded article of the present invention, and vapor deposition is preferred to form a metal oxide layer on the resin molded article of the present invention. Vapor deposition and plating may be used in combination. For example, a metal layer formed by vapor deposition is used to carry out electroplating.

The resin molded article of the present invention includes a resin molded article having a metal layer and a metal oxide layer. The formation of a metal layer or metal oxide layer on the surface of the resin molded article include the formation of a carbon layer having conductivity or a conductive polymer layer like the metal layer as far as the effect of the present invention is obtained.

The thickness of the above metal layer or metal oxide layer is not particularly limited. However, a relatively thin layer is preferred in the present invention. In this case, use is more made of the feature of the present invention. That is, for surface modification with a metal layer or metal oxide layer, the thickness of the layer must be made large if the surface smoothness of a resin molded article is low. However, the surface of the resin molded article of the present invention can be modified efficiently with a thin layer.

The thickness of the metal layer or metal oxide layer of the resin molded article is preferably 50 μm or less in total when there are a plurality of layers because the effect of the present invention is obtained. The thickness is more preferably 20 μm or less, much more preferably 5 μm or less, particularly preferably 2 μm or less. The lower limit is suitably 0.001 μm. Further, when surface modification is carried out to a thickness 500 times or less the arithmetic mean roughness Ra measured in accordance with JIS B0601 of a resin molded article alone without a metal layer or metal oxide layer, use is made of the advantage of the resin molded article of the present invention. The thickness is preferably 200 times or less, more preferably 100 times or less, particularly preferably 50 times or less larger than Ra.

The resin molded article having a metal layer or metal oxide layer of the present invention is advantageously used in various fields. For example, it can be used in precision optical reflection parts such as lamp reflectors, polygon mirrors, diffraction gratings and reflection mirrors (especially for laser light), optical recording media, transparent electrodes for use in the cells of display devices and solar cells, magnetic recording media, capacitors, speakers and EMI shielded housing molded articles. Plated decorative molded articles are also used in these fields.

They are particularly preferably used in members rotating at a high speed or moving at a high speed, making use of excellent stiffness and lightweight. For example, they can be used in polygon mirrors and other movable reflection mirrors, optical recording media, magnetic recording media and speakers.

EXAMPLES

Figure 1:
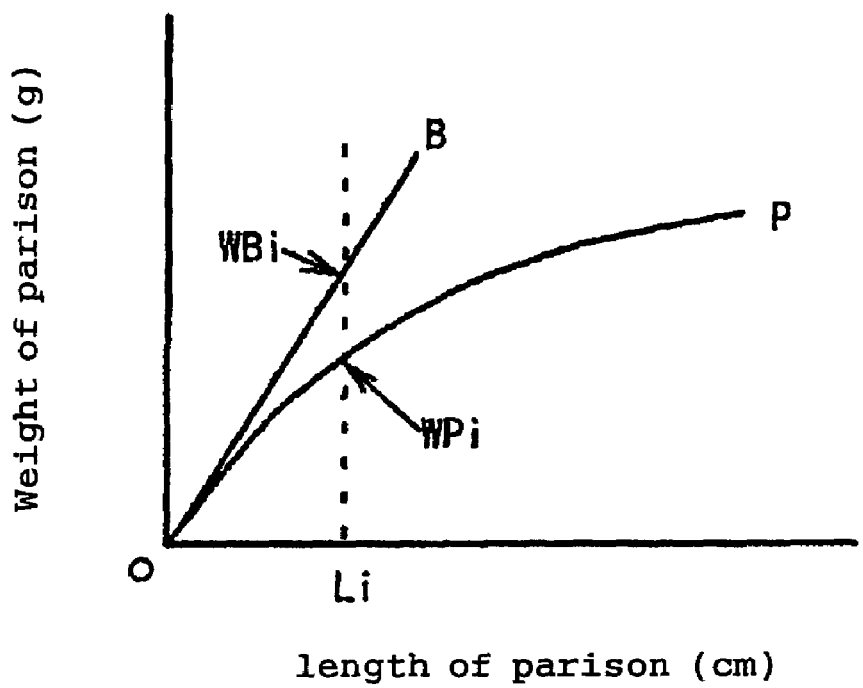
FIG. 1 is a diagram for measuring the drawdown characteristics of the present invention.

The following examples are given to further illustrate the present invention. The present invention is not limited by these examples.

Characteristic properties were measured by the following methods in Examples. The following raw materials were used.

(I) Evaluation Items (1) Content of Layered Silicate (Inorganic Content)

A test sample was molded by an injection molding machine (IS-150EN of Toshiba Machine Co., Ltd.) at a cylinder temperature of 260° C., a mold temperature of 80° C. and a molding cycle of 40 seconds, the molded test sample was cut, placed in a crucible to be weighed, heated at 600° C., maintained at that temperature for 6 hours and left to be cooled, and the ashed residue remaining in the crucible was weighed to measure the amount (wt %) of a layered silicate (inorganic content) based on 100 wt % of the composition.

(2) Measurement of Viscosity Average Molecular Weight and a Reduction in Viscosity Average Molecular Weight ($\Delta M$)

A test sample was molded under the same conditions as in (1), and its viscosity average molecular weight was measured by the method described in this text. The molding operation of the test sample was suspended for 10 minutes during the molding to extend the melt residence time of the resin and then the difference ($\Delta M$) between the viscosity average molecular weight of a molded product obtained right after this and the viscosity average molecular weight of the test sample molded under the conditions (1) was obtained.

(3) Mechanical Properties

A test sample was molded under the same conditions as in (1), and a flexural test was made on the molded test sample in accordance with ASTM D790 (size of test sample: 127 mm (length)×12.7 mm (width)×6.4 mm (thickness)).

(4) Heat Resistance

A test sample was molded under the same conditions as in (1), and the deflection temperature under load of the molded test sample was measured in accordance with ASTM D648 (size of the test sample: 127 mm (length)×12.7 mm (width)× 6.4 mm (thickness)).

(5) Evaluation of Appearance

A flat board having a thickness of 2 mm was molded under the same conditions as in (1), and the surface appearance of the molded product was evaluated with the eye.

○ indicates that no agglomerate of a layered silicate is seen at all and the molded product is excellent in surface gloss, Δ indicates that some agglomerates of a layered silicate are seen and the molded product is slightly inferior in surface gloss, and X indicates that agglomerates of a layered silicate are seen and the molded product is inferior in surface gloss. A molded product evaluated as ○ has surface smoothness equivalent to a flat board made of a polycarbonate resin alone as the component A.

(6) Melt Viscosity Characteristics

A test sample having a diameter of 25 mm and a thickness of 2 mm cut out from a 2 mm-thick flat plate was measured by a parallel disk type rotary rheometer (RDA-II dynamic analyzer of Rheometric Scientific Inc.). A test was made on the parallel plate sample having a diameter of 25 mm at a frequency range of 100 to 0.01 rad/s, a distortion of 5% and a temperature of 220 to 280° C. (frequency range at each measurement temperature of 100 to 0.1 rad/s). The complex viscosity coefficients ($\eta a$ and $\eta b$ (Pa·s)) at angular frequencies of 1 rad/s and $10^2$ rad/s were obtained from a master curve obtained from the measurement values at a standard temperature of 240° C. and the conversed measurement valu at other temperatures based on temperature-frequency conversion rules.

(7) Dispersion Thickness of Layered Silicate

A 50 to 100 nm-thick cut piece was prepared by a microtome, observed through a transmission electron microscope (LEM-100 of Topcon Corporation) at an acceleration voltage of 100 kV and photographed at a magnification of ×10,000. The obtained photomicrograph was analyzed to measure the thickness of the layered silicate so as to obtain its dispersion thickness.

(8) Measurement of Interlayer Spacing of Layered Silicate

This measurement was carried out by a powder X-ray diffraction device (RIGAKU ROTAFLEX RU300 of Rigaku Corporation). The interlayer spacing of the organo-modified layered silicate was measured by filling a powder sample in a depression in a glass sample table. The interlayer spacing of the layered silicate contained in the resin composition was measured by molding a 6.4 mm-thick bar-like test sample under the same conditions as in (1), cutting the molded product to a length of 20 mm, and fixing it in the opening of the sample table such that it became flush with the measurement reference plane. Diffraction peaks obtained by the measurement were the base peaks of the layered silicate. Out of these, a diffraction peak having the smallest angle was considered as a peak corresponding to the interlayer spacing of the (001) plane and calculated from the following Bragg's expression.

$$d=\lambda/(2 \sin \theta)$$

wherein d is the interlayer spacing (spacing between layers) (nm), 2θ is the diffraction angle (°) of a diffraction peak, and λ is an X-ray measurement wavelength (nm).

The measurement conditions are given below.

X-ray source: Cu-Kα (X-ray measurement wavelength of $1.5418\times10^{-10}$ m), 50 kV-200 mA
Slit: DS/SS ½°
Rs 0.15 mm-graphite monochrometer-0.45 mm
Method: 2θ–θ
Scan: 0.05 step/i to 4 sec.
Scanning range: 1 to 200

(9) Arithmetic Mean Roughness (Ra)

The arithmetic mean roughness Ra of a resin molded article was measured by a surface roughness measuring instrument (Surfcom 1400A of Tokyo Seimitsu Co., Ltd.) in accordance with JIS B0601-1994.

(II) (Raw Materials)

The following raw materials were used.

(Component A: Polycarbonate Resin)

(A-1) polycarbonate resin comprising bisphenol A and p-tert-butylphenol as a terminal capping agent and manufactured by the phosgene method. The polycarbonate resin was manufactured without using an amine-based catalyst and comprised 10 mol % of a terminal hydroxyl group and had a viscosity average molecular weight of 23,900.

(A-2, A-3, A-4) linear polycarbonate resin powders comprising bisphenol A and p-tert-butylphenol as a terminal capping agent and manufactured by the phosgene method. They had viscosity average molecular weights of 16,000 (A-2), 23,700 (A-3) and 27,000 (A-4).

(A-5) aromatic polycarbonate resin pellet having a viscosity average molecular weight of 29,500 manufactured by melt mixing together 10 parts by weight of a linear aromatic polycarbonate resin having a viscosity average molecular weight of 15,200, 80 parts by weight of a linear aromatic polycarbonate resin having a viscosity average molecular weight of 23,700 and 10 parts by weight of a linear aromatic polycarbonate resin having a viscosity average molecular weight of 120,000, all of which comprise bisphenol A, p-tert-butylphenol as a terminal capping agent and phosgene and are manufactured by the interfacial polycondensation method.

(A-6) branched aromatic polycarbonate resin pellet (Toughlon IB2500 of Idemitsu Petrochemical Co., Ltd.)
(A-7) polyarylate resin (U polymer U-100 of Unitika, Ltd.)
(A-8) ABS resin (Santac UT61 of Nippon A & L Inc.)

(Component B: Layered Silicate)
synthetic fluorine mica (Somasif ME-100 of Co-op Chemical Co., Ltd., cation exchange capacity: 110 milliequivalents/100 g)

Organic onium ions used to be exchanged with cations between layers of the layered silicate are given below.
(1) tri-n-octylmethylammonium chloride (Tokyo Kasei Kogyo Co., Ltd.: first-grade reagent)
(2) tri-n-butyl-n-dodecylphosphonium bromide (Hishicolin PX-412B of Nippon Chemical Industrial, Co., Ltd.)
(4) distearyl dimethylammonium chloride (Tokyo Kasei Kogyo Co., Ltd: first-grade reagent)

(Component C: Compound Having Affinity for an Aromatic Polycarbonate and a Hydrophilic Component)
(C-1) styrene-maleic anhydride copolymer (DYLARK 332-80 of Nova Chemicals Japan Co., Ltd., content of maleic anhydride: about 15 wt %)
(C-2) styrene-maleic anhydride copolymer (DYLARK 232 of Nova Chemicals Japan Co., Ltd., content of maleic anhydride: about 10 wt %)
(C-3) polyether ester copolymer produced by the method to be described hereinafter
(C-4) (2-isopropenyl-2-oxazoline)-styrene-acrylonitrile copolymer (EPOCROS RAS-1005 of Nippon Shokubai Co., Ltd., content of 2-isopropenyl-2-oxazoline: about 5 wt %)
(C-5) (2-isopropenyl-2-oxazoline)-styrene copolymer (EPOCROS RPS-1005 of Nippon Shokubai Co., Ltd., content of 2-isopropenyl-2-oxazoline: about 5 wt %)
(C-6) (for comparison) nylon 6 (Ube Nylon 1015B of Ube Industries, Ltd.)

Trimethyl phosphate (TMP of Daihachi Chemical Industry, Co., Ltd.), wollastonite (NYGLOS4 of Nyco Minerals Ltd.), talc (HST-0.8 of Hayashi Kasei Co., Ltd.) and glass fiber (T-511 of GF Co., Ltd., 13 μm-diameter and 3 mm-length chopped strand) were used as other components.

(III) Method of Producing Polyether Ester Copolymer

Dimethyl terephthalate (DMT), dimethyl isophthalate (DMI), tetramethylene glycol (TMG), ethylene glycol (EG), polyethylene glycol (PEG) and tetrabutyl titanate (0.090 mol % based on the acid component) as a catalyst were fed to a reactor to carry out an esterification reaction at an inside temperature of 190° C. After about 80% of the theoretical amount of methanol was distilled out, the temperature began to be raised and the pressure was gradually reduced to carry out a polycondensation reaction. After a vacuum degree of 1 mmHg or less was reached, the reaction was continued at 240° C. for 200 minutes. Thereafter, the Irganox 1010 as an antioxidant was added in an amount of 5 wt % based on polyethylene glycol to terminate the reaction. The composition of the purified polymer is shown in Table 1.

(IV) Method of Producing an Ion Exchanged Compound Between Layers

Ion exchange of synthetic fluorine mica with the above organic onium ion was carried out by the following method. About 100 g of the synthetic fluorine mica was weighed and dispersed in 10 liters of water heated at room temperature under agitation, a chloride or bromide of an onium ion was added in an amount of 0.8 to 1.2 times the cation exchange equivalent of the synthetic fluorine mica and stirred for 6 hours. The precipitated solid was separated by filtration, rinsed in 30 liters of desalted water under agitation and separated by filtration again. These rinsing and filtration operations were carried out three times. The obtained solid was dried with air for 3 to 7 days, ground in a mortar, dried with 50° C. hot air for 3 to 10 hours (which differs according to the type of a guest onium ion), and ground in the mortar again until the maximum particle diameter became about 100 μm. The content of the residual water evaluated from a reduction in thermogravity when the solid was maintained at 120° C. in a nitrogen stream for 1 hour to be dried with hot air was 2 to 3 wt %. The ion exchange rate of the onium ion was obtained by measuring the weight fraction of the residue when the ion exchanged layered silicate was maintained at 500° C. in a nitrogen stream for 3 hours. The produced organic onium ion exchanged synthetic fluorine mica is shown in Table 2.

TABLE 1

| | Acid component | Glycol components | | | Properties | |
|---|---|---|---|---|---|---|
| | DMT/DMI (molar ratio) | TMG/EG (molar ratio) | Polymerization degree n of PEG | TMG + EG/PEG (weight ratio) | IV (dl/g) | Tm (° C.) |
| Synthetic example 1 | 85/15 | 95/5 | 85 | 45/55 | 1.24 | 171 |

TABLE 2

| Component B | Layered silicate | Organic onium ion compound used for ion exchange | Ion exchange rate of organic onium ion based on cation exchange capacity of layered silicate (%) |
|---|---|---|---|
| B-1 | Synthetic fluorine mica (Somasif ME-100) | none | — |
| B-2 | Same as above | tri-n-octylmethylammonium chloride | ≧98 |
| B-3 | Same as above | tri-n-butyl-n-dodecylphosphonium bromide | ≧98 |
| B-4 | Same as above | distearyl dimethylammonium chloride | ≧98 |

Examples 1 to 17, and Comparative Examples 1 to 9

Components were dry blended together in ratios shown in Table 3 and Table 4, melt kneaded together by a vented twin-screw extruder (KTX30 of Kobe Steel, Ltd.) having a diameter of 30 mm, an L/D of 33.2 and screws in two kneading zones at a cylinder temperature of 280° C., extruded and cut into strands to obtain pellets (to be referred to as "method 1" in Table 3 and Table 4). In some Examples, the components B and C were dry blended together in a ratio shown in the tables and pelletized in the same manner as described above (cylinder temperature of 230° C.) except that the cylinder temperature was changed to 200° C. in Examples 1 to 5 and to 230° C. in Examples 9, 11, 13 and 14, and then the component A and other components were pelletized in the same manner as described above (to be referred to as "method 2" in Table 3 and Table 4). The cylinder temperature was 300° C. in Example 15 alone.

As for the sample of Example 17, the pellet of Example 2 and wollastonite were dry blended together in a weight ratio of 95/5, melt kneaded together by a vented twin-screw extruder (KTX30 of Kobe Steel, Ltd.) having a diameter of 30 mm, an L/D of 33.2 and screw in two kneading zones at a cylinder temperature of 280° C., extruded and cut into strands to obtain a pellet (not shown in Table 3 and Table 4).

The obtained pellet was dried by a hot air circulating drier at 100° C. for 5 hours. After drying, the test sample was molded by an injection molding machine (IS-150EN of Toshiba Machine Co., Ltd.) at a cylinder temperature of 260° C., a mold temperature of 80° C. and a molding cycle of 40 seconds. The sample of Example 15 was molded at a cylinder temperature of 300° C.

The evaluation results of these samples are shown in Table 5 and Table 6. Aluminum was vacuum metallized on each molded product by a vacuum metallizer (A6425 of Chuo Riken Co., Ltd.) to a thickness of 0.5 μm. The values of arithmetic mean roughness Ra before and after deposition are shown in Table 6.

TABLE 3

| | Composition (parts by weight and type) | | | | | | | | | |
|---|---|---|---|---|---|---|---|---|---|---|
| | Component A | | Component B | | Component C | | Other component | | | Content of layered silicate in composition (wt %) |
| | Type | Parts by weight | Type | Parts by weight | Type | Parts by weight | Type | Parts by weight | Extrusion method | |
| C. Ex. 1 | A-2 | 100 | — | — | — | — | TMP | 0.1 | Method 1 | — |
| C. Ex. 2 | A-3 | 100 | — | — | — | — | TMP | 0.1 | Method 1 | — |
| C. Ex. 3 | A-4 | 100 | — | — | — | — | TMP | 0.1 | Method 1 | — |
| C. Ex. 4 | A-3 | 100 | — | — | — | — | TMP Talc | 0.1 5.3 | Method 1 | — |
| C. Ex. 5 | A-3 | 100 | — | — | — | — | TMP GF | 0.1 5.3 | Method 1 | — |
| C. Ex. 6 | A-3 | 100 | — | — | — | — | TMP GF | 0.1 11 | Method 1 | — |
| C. Ex. 7 | A-1 | 100 | B-1 | 5.3 | — | — | — | — | Method 1 | 4.8 |
| C. Ex. 8 | A-1 | 100 | B-4 | 8.1 | — | — | — | — | Method 1 | 4.9 |
| C. Ex. 9 | A-1 | 100 | B-2 | 7.9 | C-6 | 12 | TMP | 0.1 | Method 1 | — |

C. Ex. = Comparative Example

TABLE 4

| | Composition (parts by weight and type) | | | | | | | | | |
|---|---|---|---|---|---|---|---|---|---|---|
| | Component A | | Component B | | Component C | | Other component | | | Content of layered silicate in composition (wt %) |
| | Type | Parts by weight | Type | Parts by weight | Type | Parts by weight | Type | Parts by weight | Extrusion method | |
| Ex. 1 | A-3 | 100 | (B-7) | 3.9 | C-1 | 5.5 | TMP | 0.1 | Method 2 | 2.4 |
| Ex. 2 | A-3 | 100 | B-2 | 3.9 | C-1 | 5.5 | TMP | 0.1 | Method 2 | 2.5 |
| Ex. 3 | A-3 | 100 | B-2 | 3.9 | C-2 | 5.5 | TMP | 0.1 | Method 2 | 2.4 |
| Ex. 4 | A-5 | 100 | B-2 | 3.9 | C-1 | 5.5 | TMP | 0.1 | Method 2 | 2.4 |
| Ex. 5 | A-6 | 100 | B-2 | 3.9 | C-1 | 5.5 | TMP | 0.1 | Method 2 | 2.4 |
| Ex. 6 | A-1 | 100 | B-2 | 8.7 | C-1 | 12 | — | — | Method 1 | 5 |
| Ex. 7 | A-1 | 100 | B-2 | 8.7 | C-1 | 12 | TMP | 0.1 | Method 1 | 4.9 |
| Ex. 8 | A-1 | 100 | B-2 | 8.7 | C-1 | 12 | TMP | 0.1 | Method 1 | 4.8 |
| Ex. 9 | A-1 | 100 | B-2 | 8.7 | C-1 | 12 | TMP | 0.1 | Method 2 | 4.8 |
| Ex. 10 | A-1 | 100 | B-3 | 8.6 | C-1 | 12 | TMP | 0.1 | Method 1 | 4.8 |
| Ex. 11 | A-1 | 100 | B-4 | 8.6 | C-1 | 12 | TMP | 0.1 | Method 2 | 4.9 |
| Ex. 12 | A-1 | 100 | B-2 | 8.7 | C-3 | 12 | TMP | 0.1 | Method 2 | 5.1 |
| Ex. 13 | A-1 | 100 | B-2 | 2.1 | C-4 | 2.9 | TMP | 0.1 | Method 2 | 1.5 |
| Ex. 14 | A-1 | 100 | B-2 | 2.1 | C-5 | 2.9 | TMP | 0.1 | Method 2 | 1.5 |
| Ex. 15 | A-1 A-7 | 60 40 | B-2 | 8.7 | C-1 | 12 | TMP | 0.1 | Method 1 | 4.8 |
| Ex. 16 | A-1 A-8 | 70 30 | B-2 | 8.7 | C-1 | 12 | TMP | 0.1 | Method 1 | 4.8 |

Ex. = Example

TABLE 5

Characteristic properties

| | Proportion of silicate particles having a thickness of 100 nm or less (%) | Interlayer spacing in component B (nm) | Interlayer spacing in composition (nm) | Viscosity average molecular weight | ΔM |
|---|---|---|---|---|---|
| C. Ex. 1 | — | — | — | 16,100 | 400 |
| C. Ex. 2 | — | — | — | 23,700 | 100 |
| C. Ex. 3 | — | — | — | 26,700 | 200 |
| C. Ex. 4 | — | — | — | 22,000 | 800 |
| C. Ex. 5 | — | — | — | 22,800 | 300 |
| C. Ex. 6 | — | — | — | 22,900 | 400 |
| C. Ex. 7 | <5 | 0.95 | 0.95 | 17,800 | 300 |
| C. Ex. 8 | 55 | 2.96 | 2.57 | 8,600 | Impossible to measure |
| C. Ex. 9 | Impossible to extrude | | | | |
| Ex. 1 | 95 | 2.96 | 2.43 | 17,700 | 400 |
| Ex. 2 | 85 | 2.52 | 1.54 | 21,300 | 100 |
| Ex. 3 | 82 | 2.52 | 1.6 | 21,400 | 100 |
| Ex. 4 | 83 | 2.52 | 1.61 | 29,100 | 400 |
| Ex. 5 | 83 | 2.52 | 1.63 | 23,800 | 200 |
| Ex. 6 | 85 | 2.52 | 1.55 | 14,600 | 1,100 |
| Ex. 7 | 85 | 2.52 | 1.54 | 15,800 | 700 |
| Ex. 8 | 85 | 2.52 | 1.6 | 16,200 | 600 |
| Ex. 9 | 95 | 2.52 | 1.54 | 20,500 | 200 |
| Ex. 10 | 89 | 2.6 | 2.05 | 16,800 | 300 |
| Ex. 11 | 95 | 2.96 | 2.43 | 13,900 | 400 |
| Ex. 12 | 78 | 2.52 | 1.89 | 17,000 | 1,200 |
| Ex. 13 | 72 | 2.52 | 1.93 | 19,100 | 500 |
| Ex. 14 | 72 | 2.52 | 1.93 | 20,200 | 600 |
| Ex. 15 | 88 | 2.52 | 1.52 | 17,200 | 100 |
| Ex. 16 | 88 | 2.52 | 1.54 | 17,300 | 400 |

C. Ex. = Comparative Example
Ex. = Example

TABLE 6

Characteristic properties

| | Flexural strength (MPa) | Flexural modulus (MPa) | Deflection temperature under load (° C.) | Appearance of molded product | Surface roughness Ra (μm) Molded product before deposition | Surface roughness Ra (μm) Molded product after deposition |
|---|---|---|---|---|---|---|
| C. Ex. 1 | 92 | 2,150 | 130 | ○ | 0.03 | 0.03 |
| C. Ex. 2 | 90 | 2,130 | 129 | ○ | 0.03 | 0.03 |
| C. Ex. 3 | 90 | 2,130 | 129 | ○ | 0.03 | 0.03 |
| C. Ex. 4 | 91 | 2,430 | 130 | X | 0.14 | 0.1 |
| C. Ex. 5 | 112 | 3,100 | 130 | X | 0.32 | 0.25 |
| C. Ex. 6 | 123 | 3,950 | 134 | X | 0.5 | 0.39 |
| C. Ex. 7 | 95 | 2,360 | 127 | X | 0.11 | 0.09 |
| C. Ex. 8 | 30 | 2,430 | 115 | ○ | 0.07 | 0.05 |
| C. Ex. 9 | Impossible to extrude | | | | | |
| Ex. 1 | 103 | 3,100 | 122 | ○ | 0.03 | 0.03 |
| Ex. 2 | 100 | 3,010 | 129 | ○ | 0.03 | 0.03 |
| Ex. 3 | 100 | 3,020 | 128 | ○ | 0.03 | 0.03 |
| Ex. 4 | 102 | 3,070 | 129 | ○ | 0.04 | 0.03 |
| Ex. 5 | 104 | 3,100 | 129 | ○ | 0.04 | 0.03 |
| Ex. 6 | 101 | 3,850 | 120 | ○ | 0.04 | 0.03 |
| Ex. 7 | 103 | 3,910 | 120 | ○ | 0.04 | 0.03 |
| Ex. 8 | 103 | 3,760 | 121 | ○ | 0.04 | 0.03 |
| Ex. 9 | 109 | 3,590 | 120 | ○ | 0.03 | 0.03 |
| Ex. 10 | 106 | 3,860 | 113 | ○ | 0.04 | 0.04 |
| Ex. 11 | 96 | 3,600 | 112 | ○ | 0.03 | 0.03 |
| Ex. 12 | 71 | 3,510 | 93 | ○ | 0.06 | 0.05 |
| Ex. 13 | 98 | 2,850 | 115 | ○ | 0.04 | 0.03 |
| Ex. 14 | 100 | 2,880 | 122 | ○ | 0.04 | 0.03 |
| Ex. 15 | 104 | 3,880 | 138 | ○ | 0.04 | 0.03 |
| Ex. 16 | 101 | 3,700 | 108 | ○ | 0.03 | 0.03 |

C. Ex. = Comparative Example
Ex. = Example

As obvious from the results of Table 5 and Table 6, it is understood that a noncrystalline thermoplastic resin composition, more specifically an aromatic polycarbonate resin composition having a dispersion mode in which a layered silicate has a specific dispersion thickness and a smaller interlayer spacing in the composition than that of the layered silicate alone by a specific value or more has excellent mechanical properties.

Although the molecular weight of the aromatic polycarbonate resin tends to be lowered by increasing the amount of the layered silicate, when a compound having affinity for the aromatic polycarbonate and a hydrophilic component is mixed with the aromatic polycarbonate resin, not only its mechanical properties are improved but also a reduction in the molecular weight of the aromatic polycarbonate resin is greatly suppressed. These effects are particularly marked when a styrene-maleic anhydride copolymer is used. As a reduction in the molecular weight is suppressed more, the aromatic polycarbonate resin becomes more excellent in heat stability and can be molded into various forms. As a result, it has excellent strength.

Further, when all the components are not melt kneaded together at the same time, that is, the components B and C are melt kneaded together in advance and then melt kneaded with the component A and other component, the effect of suppressing a reduction in the molecular weight of the aromatic polycarbonate resin becomes marked. This effect becomes particularly marked when a styrene-maleic anhydride copolymer is used.

The molded article of the resin composition of the present invention has surface smoothness equivalent to a molded article of an aromatic polycarbonate resin alone containing no layered silicate. Excellent surface smoothness and excellent mechanical properties such as stiffness cannot be obtained when an ordinary inorganic reinforcing filler such as talc or glass fiber is used. Excellent surface smoothness is effective particularly when a metal layer or metal oxide layer is formed on the surface of the molded article. According to the present invention, there is obtained a resin molded article having stiffness and surface smoothness which cannot be obtained by using an ordinary inorganic filler.

Evaluation of Melt Viscosity Characteristics

The melt viscosity characteristics of the samples of Examples 1 to 5 and Comparative Examples 1 to 3 were measured. These results are shown in Table 7. The samples of Examples 1 to 5 show a log[ηa/ηb] (ηa is a complex viscosity coefficient (Pa·s) measured at an angular frequency of 1 rad/s by a parallel disk type rotary rheometer and ηb is a complex viscosity coefficient (Pa·s) measured at an angular frequency of $10^2$ rad/s by a parallel disk type rotary rheometer) of 0.5 or more, which is specially large value. The characteristics are extremely useful for molding such as injection molding, extrusion molding or blow molding. The concrete effect will be detailed hereinbelow.

TABLE 7

Melt viscosity characteristics

| | ηa(Pa·s) | ηb(Pa·s) | log[ηa/ηb] |
|---|---|---|---|
| C. Ex. 1 | 650 | 400 | 0.21 |
| C. Ex. 2 | 2,050 | 1,250 | 0.21 |
| C. Ex. 3 | 16,000 | 9,500 | 0.23 |
| Ex. 1 | 5,000 | 750 | 0.82 |
| Ex. 2 | 8,050 | 1,100 | 0.86 |
| Ex. 3 | 7,900 | 1,200 | 0.82 |
| Ex. 4 | 24,900 | 3,900 | 0.81 |
| Ex. 5 | 25,300 | 2,000 | 1.10 |

C. Ex. = Comparative Example
Ex. = Example

Evaluation of Injection Moldability

The pellets of Examples 1 to 5 and 17 and Comparative Examples 1 to 3 were dried by a hot air circulating drier at 100° C. for 5 hours, and 0.8 mm-thick UL combustion test samples having a gate at one end were molded from the pellets by an injection molding machine (SG260-HP of Sumitomo Heavy Industries, Ltd.) at a mold temperature of 80° C., a molding cycle of 40 seconds and an injection rate of 350 mm/sec. As for the amount of drooling, the amount of a resin oozed from the end of the nozzle when the nozzle was separated from the mold was measured during cooling after the injection and metering of the resin for injection molding. As for the stringing phenomenon, the frequency of the occurrence of a phenomenon that the sprue portion of a molded product and a nozzle portion are linked by a 30 cm or longer string-like resin at the time of taking out the molded product by opening the mold was evaluated when the nozzle is contacted to the mold during cooling after the injection and metering of the resin for injection molding. As for the generation of a flash, the incidence of a flash in the molded product and the runner portion was evaluated. The moldability when a flash was evaluated is shown in Table 8.

TABLE 8

| Sample | Molding temperature (° C.) | Injection moldability | | |
|---|---|---|---|---|
| | | Amount of drooling (g) | Stringing phenomenon | Generation of a flash |
| C. Ex. 1 | 260 | Almost none | None | (Short shot of molded product) |
| | 280 | 2.2 g | Occurs (frequency ≧ 80%) | Occurs frequently |

TABLE 8-continued

| Sample | Molding temperature (° C.) | Injection moldability | | |
|---|---|---|---|---|
| | | Amount of drooling (g) | Stringing phenomenon | Generation of a flash |
| C. Ex. 2 | 300 | Almost none | None | (Short shot of molded product) |
| | 320 | 0.8 g | Occurs (frequency ≧ 50%) | Occurs frequently |
| C. Ex. 3 | 320 | Almost none | None | (Short shot of molded product) |
| Ex. 1 | 280 | Almost none | None | None |
| Ex. 2 | 280 | Almost none | None | None |
| Ex. 3 | 280 | Almost none | None | None |
| Ex. 4 | 280 | Almost none | None | None |
| Ex. 5 | 300 | Almost none | None | None |
| Ex. 17 | 280 | Almost none | None | None |

C. Ex. = Comparative Example
Ex. = Example

As understood from the above results, the resin compositions of Examples show excellent moldability which cannot be attained by polycarbonates having various molecular weights (Comparative Examples 1 to 3).

Evaluation of Extrusion Moldability

The pellets of Examples 1 to 5 and 17 and Comparative Examples 1 to 3 were dried by a hot air circulating drier at 100° C. for 5 hours and extruded by a single-screw extruder having a sheet T die at the end and a diameter of 40 mm at a screw revolution of 40 rpm to mold 100 μm-thick sheets. The extrudability was evaluated based on sheet take-off properties and screw motor load current at the time of extrusion. The extrudability is shown in Table 9.

TABLE 9

| Sample | extrusion temperature (° C.) | Extrusion moldability | | Sheet properties tensile yield strength (MPa) | |
|---|---|---|---|---|---|
| | | Sheet take-off properties | Screw motor load current at the time of extrusion (A) | Flow direction | Perpendicular direction |
| C. Ex. 1 | 280 | Unsatisfactory due to large drawdown | 4 | — | — |
| C. Ex. 2 | 280 | Unsatisfactory due to slightly large drawdown | 13 | — | — |
| | 300 | Unsatisfactory due to large drawdown | 10 | — | — |
| C. Ex. 3 | 300 | Satisfactory due to small drawdown | 17 | 56 | 56 |
| Ex. 1 | 280 | Satisfactory due to almost no drawdown | 7 | 59 | 59 |
| Ex. 2 | 280 | Satisfactory due to almost no drawdown | 7 | 58 | 59 |
| Ex. 3 | 280 | Satisfactory due to almost no drawdown | 6 | 59 | 59 |
| Ex. 4 | 280 | Satisfactory due to almost no drawdown | 8 | 59 | 59 |
| Ex. 5 | 280 | Satisfactory due to almost no drawdown | 15 | 58 | 59 |
| Ex. 17 | 280 | Satisfactory due to almost no drawdown | 6 | 62 | 55 |

C. Ex. = Comparative Example
Ex. = Example

As obvious from the above results, it is understood that the resin compositions of Examples showed excellent extrudability which cannot be attained by a polycarbonate having a low molecular weight (Comparative Example 1) and a polycarbonate having a high molecular weight (Comparative Example 3). The obtained molded products except for the resin composition of Example 17 had surface smoothness equivalent to molded products of only the polycarbonate resins of Comparative Examples 1 to 3.

Evaluation of Blow Moldability

The pellets of Examples 1 to 5 and 17 and Comparative Examples 1 to 3 were dried by a hot air circulating drier at 100° C. for 5 hours and parisons were formed from the pellets by a blow molding machine (Sumitomo Bekoom SE51/BA2 of Sumitomo Heavy Industries, Ltd.) and cut to a predetermined length to measure their weights so as to evaluate their drawdown properties. The used blow molding machine had a screw diameter of 50 mm, a die outer diameter of 60 mm and a die inner diameter of 56 mm. The drawdown properties (DD value) were obtained from the following equation by measuring the weight of each parison when a desired length was achieved below a die after it was extruded from the die of the blow molding machine, plotting the length of the parison on the horizontal axis and the weight of the parison on the vertical axis to draw a curve OP, and drawing a tangent OB to the curve line from the origin as shown in FIG. 1 to designate a weight corresponding to the length Li of the parison as WPi and a weight at an intersection point with the tangent OB corresponding to the length Li of the parison as WBi.

$$DD(\%) = \{(WBi - WPi)/WBi\} \times 100$$

The drawdown properties when molding was carried out at a cylinder temperature of 280° C. were evaluated at an Li of 50 cm. The results are shown in Table 10.

Separate from the evaluation of the above drawdown properties, a box-like vessel measuring 300 mm (length)×100 mm (width)×40 mm (depth) was blow molded at the above cylinder temperature, a mold temperature of 80° C. and a blow air pressure of 0.5 MPa. The obtained molded products had excellent dimensional accuracy and surface smoothness equivalent to a molded product of a polycarbonate resin alone except for Example 17.

TABLE 10

| Sample | Blow moldability DD value (%) |
| --- | --- |
| C. Ex. 2 | 41 |
| Ex. 1 | 25 |
| Ex. 2 | 23 |
| Ex. 3 | 23 |
| Ex. 4 | 17 |
| Ex. 5 | 16 |
| Ex. 17 | 20 |

As understood from the above results, an increase in the weight of the parison of the polycarbonate of Comparative Example 2 was gentle because its drawdown became larger as the length of the parison increased. On the other hand, the resin compositions of Examples 1 to 5 and 17 had excellent drawdown properties and excellent blow moldability.

Examples 18 to 20 and Comparative Example 10

(Production of Molded Articles Having a Metal Layer or Metal Oxide Layer)

The following molded articles having a metal layer or metal oxide layer were produced from the above obtained pellets.

Example 18

Production of Polygon Mirror-1

The pellet of the above Example 7 was dried by a hot air circulating drier at 100° C. for 5 hours. A regular hexagonal (diameter of center hole of 20 mm) polygon mirror inscribing in a 50 mm×50 mm square was molded by an injection compression molding machine having a clamping force of 35 tons. The arithmetic mean roughness Ra of the side surface (mirror surface) of the polygon mirror molded product was 0.006 μm. A 80 nm-thick aluminum film was formed on the surface of the molded product by a DC magnetron sputtering device. The arithmetic mean roughness Ra of the side surface (mirror surface) of the molded product was 0.006 μm.

Example 19

Production of Polygon Mirror-2

A 50 nm-thick aluminum film was formed on the above a polygon mirror molded product obtained by molding the pellet of Example 7 by a DC magnetron sputtering device. The obtained molded product was electroplated to form a 10 μm-thick Ni—P plating layer. The arithmetic mean roughness Ra of the side surface (mirror surface) of the molded product having a plating layer was 0.004 μm.

Comparative Example 10

Production of Polygon Mirror-3

A mirror molded product having a plating layer was produced in the same manner as the polygon mirror-2 of Example 19 except that the pellet of Comparative Example 4 was used. The arithmetic mean roughness Ra of the side surface (mirror surface) of the molded product was 0.065 μm.

Example 20

Production of Transparent Conductive Sheet

The pellet of the above Example 7 was dried by a hot air circulating drier at 100° C. for 5 hours. The pellet was extruded by a single-screw extruder having a diameter of 40 mm and a sheet T die at the end at a screw revolution of 40 rpm and extrusion molded into a 100 μm sheet by a one-side touching roll. The arithmetic mean roughness Ra of the sheet was 0.008 μm. The sheet was cut to a size of 50 mm×50 mm, and a 40 nm-thick metal oxide layer consisting of indium and tin oxides, a 9 nm-thick silver-gold alloy layer and a 40 nm-thick metal oxide layer identical to the above layer were formed on the molded sheet by a DC magnetron sputtering device in the mentioned order to produce a transparent conductive sheet. The arithmetic mean roughness Ra of the sheet having metal oxide layers was 0.008 μm.

EFFECT OF THE INVENTION

The aromatic polycarbonate resin composition of the present invention has high stiffness, product surface appearance and heat stability, is useful in a wide variety of fields such as electric and electronic parts, OA equipment parts such as housings and mechanical parts, and auto parts and provides a marked industrial effect.

The invention claimed is:

1. A thermoplastic resin composition comprising:
   (A) 100 parts by weight of a noncrystalline thermoplastic resin component (component A);
   (B) 0.1 to 50 parts by weight of a layered silicate (component B) which satisfies the following (i) to (iii):
   (i) it has a cation exchange capacity of 50 to 200 milliequivalents/100 g, and at least 40% of the cation exchange capacity being exchanged with an organic onium ion,
   (ii) 60% or more of the layered silicate particles have a thickness of 100 nm or less in the resin composition, and
   (iii) the interlayer spacing of the layered silicate (component B) in the resin composition is smaller than the interlayer spacing of the layered silicate alone by 0.5 nm or more; and
   (C) 0.1 to 50 parts by weight of a compound (component C) having affinity for the noncrystalline thermoplastic resin as the component A and a hydrophilic component, and having a weight average molecular weight of 10,000 to 1,000,000.

2. The thermoplastic resin composition of claim 1, wherein the interlayer spacing of the layered silicate (component B) in the resin composition is smaller than the interlayer spacing of the layered silicate alone by 0.7 nm or more.

3. The thermoplastic resin composition of claim 1, wherein the component A contains at least 50 wt % of an aromatic polycarbonate resin.

4. The thermoplastic resin composition of claim 1, wherein the component B contains at least alkyl groups having 6 to 20 carbon atoms or aryl groups having 6 to 12 carbon atoms as organic groups forming an organic onium ion.

5. The thermoplastic resin composition of claim 1, wherein the component B contains alkyl groups having 10 or less carbon atoms as organic groups forming an organic onium ion and at least one of the alkyl groups has 6 to 10 carbon atoms.

6. The thermoplastic resin composition of claim 1, wherein the component C is a polymer having affinity for the noncrystalline thermoplastic resin component as the component A and a functional group consisting of a carboxyl group and/or a derivative thereof.

7. The thermoplastic resin composition of claim 1, wherein the component C is a styrene-containing polymer having a functional group consisting of a carboxyl group and/or a derivative thereof.

8. The thermoplastic resin composition of claim 1, wherein the component C is a styrene-maleic anhydride copolymer or polyether ester copolymer.

9. A polycarbonate resin composition comprising:
   (A) 100 parts by weight of a resin component (component A) containing at least 50 wt % of an aromatic polycarbonate resin;
   (B) 0.1 to 50 parts by weight of a layered silicate (component B) which satisfies the following (i) and (ii):
   (i) it has a cation exchange capacity of 50 to 200 milliequivalents/100 g, and
   (ii) 60% or more of the layered silicate particles have a thickness of 100 nm or less in the resin composition; and
   (C) 0.1 to 50 parts by weight of a compound (component C) having affinity for the aromatic polycarbonate resin and a hydrophilic component, and having a weight average molecular weight of 10,000 to 1,000,000.

10. The polycarbonate resin composition of claim 9, wherein the component B has a cation exchange capacity of 50 to 200 milliequivalents/100 g and at least 40% of the cation exchange capacity is exchanged with an organic onium ion.

11. The polycarbonate resin composition of claim 9, wherein the component B contains at least alkyl groups having 6 to 20 carbon atoms or aryl groups having 6 to 12 carbon atoms as organic groups forming an organic onium ion.

12. The polycarbonate resin composition of claim 9, wherein the component B contains alkyl groups having 10 or less carbon atoms as organic groups forming an organic onium ion and at least one of the alkyl groups has 6 to 10 carbon atoms.

13. The polycarbonate resin composition of claim 9, wherein the component C is a polymer having affinity for the aromatic polycarbonate resin and a functional group consisting of a carboxyl group and/or a derivative thereof.

14. The polycarbonate resin composition of claim 9, wherein the component C is a styrene-containing polymer having a functional group consisting of a carboxyl group and/or a derivative thereof.

15. The polycarbonate resin composition of claim 9, wherein the component C is a styrene-maleic anhydride copolymer or polyether ester copolymer.

16. A polycarbonate resin composition comprising:
   (A) 100 parts by weight of a resin component (component A) containing at least 50 wt % of an aromatic polycarbonate resin;
   (B) 0.1 to 50 parts by weight of a layered silicate (component B) which satisfies the following (i) to (iii):
   (i) it has a cation exchange capacity of 50 to 200 milliequivalents/100 g, and at least 40% of the cation exchange capacity being exchanged with an organic onium ion,
   (ii) 60% or more of the layered silicate particles have a thickness of 100 nm or less in the resin composition, and
   (iii) the interlayer spacing of the layered silicate (component B) in the resin composition is smaller than the interlayer spacing of the layered silicate alone by 0.5 nm or more; and
   (C) 0.1 to 50 parts by weight of a compound (component C) having affinity for the aromatic polycarbonate resin and a hydrophilic component, and having a weight average molecular weight of 10,000 to 1,000,000.

17. The polycarbonate resin composition of claim 16, wherein the interlayer spacing of the layered silicate (component B) in the resin composition is smaller than the interlayer spacing of the layered silicate alone by 0.7 nm or more.

18. The polycarbonate resin composition of claim 16, wherein the component A consists of (i) 60 to 100 wt % of an aromatic polycarbonate resin and (ii) 0 to 40 wt % of a styrene-containing resin or aromatic polyester resin.

19. The polycarbonate resin composition of claim 16, wherein the component B contains at least an alkyl group having 6 to 20 carbon atoms or aryl group having 6 to 12 carbon atoms as an organic group forming an organic onium ion.

20. The polycarbonate resin composition of claim 16, wherein the component B contains alkyl groups having 10 or less carbon atoms as an organic group forming an organic onium ion and at least one of the alkyl groups has 6 to 10 carbon atoms.

21. The polycarbonate resin composition of claim 16, wherein the component C is a polymer having affinity for the aromatic polycarbonate resin and a functional group consisting of a carboxyl group and/or a derivative thereof.

22. The polycarbonate resin composition of claim 16, wherein the component C is a styrene-containing polymer having a functional group consisting of a carboxyl group and/or a derivative thereof.

23. The polycarbonate resin composition of claim 16, wherein the component C is a styrene-maleic anhydride copolymer or polyether ester copolymer.

24. A molded article formed from the resin composition of claim 1, 9 or 16.

25. The molded article of claim 24 which has (i) an arithmetic mean surface roughness (Ra) of 0.1 μm or less and (ii) a flexural modulus 1.2 times or more the flexural modulus of a molded article formed from the component A constituting the resin composition.

26. A metal or metal oxide-coated molded article which is formed from the resin composition of claim 1, 9 or 16 and has a metal layer or metal oxide layer on the surface.

27. A method of producing a molded article, comprising melt extrusion molding or melt blow molding the resin composition of claim 1, 9 or 16.

28. The method of producing a molded article according to claim 27, wherein the resin composition has a complex viscosity ratio ($\log[\eta a/\eta b]$) represented by the following expression (1):

$$\log[\eta a/\eta b] \geq 0.5 \tag{1}$$

wherein $\eta a$ and $\eta b$ are complex viscosity coefficients (Pa·s) measured by a parallel disk type rotary rheometer at 240° C. and angular frequencies of 1 rad/s and $10^2$ rad/s, respectively.

29. The method of producing a molded article according to claim 27, wherein the resin composition has a reduction in viscosity mean molecular weight (ΔM) measured by a heat stability evaluation method of 3,000 or less.

30. A method of producing a thin molded article having a thickness of less than 2 mm in more than 60% of the total area, comprising melt injection molding the resin composition of claim 1, 9 or 16.

31. The method of producing a thin molded article according to claim 30, wherein the resin composition has a complex viscosity ratio ($\log[\eta a/\eta b]$) represented by the following expression (1):

$$\log[\eta a/\eta b] \geq 0.5 \tag{1}$$

wherein $\eta a$ and $\eta b$ are complex viscosity coefficients (Pa·s) measured by a parallel disk type rotary rheometer at 240° C. and angular frequencies of 1 rad/s and $10^2$ rad/s, respectively.

32. The method of producing a thin molded article according to claim 30, wherein the resin composition has a reduction in viscosity average molecular weight (ΔM) measured by a heat stability evaluation method of 3,000 or less.

33. The method of producing a thin molded article according to claim 30, wherein the molded article has a thickness of 0.05 mm to 2 mm.

34. The method of producing a thin molded article according to claim 30, wherein the injection rate for injection molding is 300 mm/sec or more.

35. A resin additive for improving the physical properties of a resin, comprising:
   (C) 100 parts by weight of a compound (component C) having affinity for a resin to be blended and a hydrophilic component, and having a weight average molecular weight of 10,000 to 1,000,000; and
   (B) 1 to 100 parts by weight of a layered silicate (component B) having a cation exchange capacity of 50 to 200 milliequivalents/g, and at least 40% of the cation exchange capacity being exchanged with an organic onium ion.

36. The resin additive of claim 35, wherein the component C is a styrene-maleic anhydride copolymer.

37. The resin additive of claim 35, wherein the resin to be blended is an aromatic polycarbonate resin.

* * * * *